(12) United States Patent
Fujii et al.

(10) Patent No.: US 9,530,405 B2
(45) Date of Patent: Dec. 27, 2016

(54) INTENTION ESTIMATING DEVICE AND INTENTION ESTIMATING METHOD

(71) Applicant: MITSUBISHI ELECTRIC CORPORATION, Chiyoda-ku (JP)

(72) Inventors: Yoichi Fujii, Chiyoda-ku (JP); Jun Ishii, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/413,544

(22) PCT Filed: Oct. 9, 2013

(86) PCT No.: PCT/JP2013/077504
§ 371 (c)(1),
(2) Date: Jan. 8, 2015

(87) PCT Pub. No.: WO2014/083945
PCT Pub. Date: Jun. 5, 2014

(65) Prior Publication Data
US 2015/0255064 A1      Sep. 10, 2015

(30) Foreign Application Priority Data

Nov. 30, 2012   (JP) ................................ 2012-262593

(51) Int. Cl.
*G10L 15/18*    (2013.01)
*G06F 17/27*    (2006.01)

(52) U.S. Cl.
CPC ........... *G10L 15/18* (2013.01); *G06F 17/2755* (2013.01); *G06F 17/2785* (2013.01); *G10L 15/1822* (2013.01)

(58) Field of Classification Search
CPC ....................... G10L 15/18; G10L 2015/223
See application file for complete search history.

(56) References Cited

U.S. PATENT DOCUMENTS 5,109,509 A * 4/1992 Katayama ............. G06F 17/271
                                                                  704/9
5,761,637 A * 6/1998 Chino ................. G10L 15/1807
                                                                  704/231

(Continued)

FOREIGN PATENT DOCUMENTS

JP       07-219961 A    8/1995
JP     2000-200273 A    7/2000

OTHER PUBLICATIONS

Masayuki Shiraki, et al., "Investigation of statistical techniques for intention understanding in spoken dialog," IPSJ SIG Notes, vol. 2004, No. 15, Feb. 7, 2004 pp. 69-74 (with English Abstract).

(Continued)

*Primary Examiner* — Brian Albertalli
(74) *Attorney, Agent, or Firm* — Oblon, McClelland, Maier & Neustadt, L.L.P.

(57) ABSTRACT

An intention estimation unit extractor that extracts one or more intention estimation units each of which is a unit on which an estimation of the intention is to be performed from an inputted language, an intention estimator that estimates a partial intention of a part which constructs each of the extracted intention estimation units, an intention co-occurrence weight calculator that calculates an intention co-occurrence weight based on a relationship between partial intentions, and an intention sequence estimator that generates an intention sequence corresponding to the inputted language by using one or more partial intentions, and generates an intention estimation result corresponding to the inputted language by using both a score showing a likelihood of the generated intention sequence and an intention co-occurrence weight which the intention co-occurrence weight calculator calculates for the partial intentions which construct the generated intention sequence are disposed.

10 Claims, 22 Drawing Sheets

(56) References Cited

U.S. PATENT DOCUMENTS

| | | | |
|---|---|---|---|
| 8,346,563 B1* | 1/2013 | Hjelm | G10L 15/1822 379/88.01 |
| 8,484,025 B1* | 7/2013 | Moreno Mengibar | G10L 15/063 704/10 |
| 2005/0010393 A1* | 1/2005 | Danieli | G10L 15/22 704/9 |
| 2006/0184370 A1* | 8/2006 | Kwak | G10L 15/1822 704/275 |
| 2007/0055529 A1* | 3/2007 | Kanevsky | G10L 15/1815 704/275 |
| 2008/0162138 A1* | 7/2008 | Gurram | G06F 3/167 704/257 |
| 2008/0310718 A1* | 12/2008 | Balchandran | G06F 17/2715 382/176 |
| 2009/0077047 A1* | 3/2009 | Cooper | G06F 17/2785 |
| 2010/0042400 A1* | 2/2010 | Block | G10L 15/18 704/9 |
| 2011/0029311 A1* | 2/2011 | Minamino | G10L 15/183 704/243 |
| 2011/0054883 A1* | 3/2011 | Yun | G06F 17/2755 704/9 |
| 2012/0035935 A1* | 2/2012 | Park | G10L 15/22 704/275 |
| 2012/0053945 A1* | 3/2012 | Gupta | G10L 15/22 704/256 |
| 2012/0296638 A1* | 11/2012 | Patwa | G06F 17/30654 704/9 |
| 2014/0079195 A1* | 3/2014 | Srivastava | G06F 17/21 379/88.01 |

OTHER PUBLICATIONS

Yuki Irie, et al., "Speech Intention Understanding Based on Spoken Dialogue Corpus," Dai 38 Kai Reports of the Meeting of Special Internet Group on Spoken Language Understanding and Dialogue Processing (SIG-SLUD-A301-03), Jul. 4, 2003, pp. 7-12 (with English Abstract).

International Search Report issued Nov. 26, 2013 in PCT/JP2013/077504 filed Oct. 9, 2013.

* cited by examiner

FIG. 7

○○Doomu Ni Tachiyottekara ×× Lando He Ikitai    0.4
(Stop at ○○Dome, then drive to ×× Land)

| | $facility$_1 Tachiyoru | $facility$_2 | Iku | Total Score | Splitting Weight | Splitting Weight Score | Intention Co-Occurrence Weight | Final Score |
|---|---|---|---|---|---|---|---|---|
| Extracted Pattern A' | 0.69 | | 0.12 | 0.01 | 0.096 | 0.001 | 0.49 | 0.0003 |
| Extracted Pattern B'+A' | 0.95 | 0.69 | 0.12 | 0.08 | 0.144 | 0.011 | 0.49 | 0.0022 |
| Extracted Pattern B'+C' | 0.95 | 0.95 | | 0.90 | 0.216 | 0.195 | 1.20 | 0.0936 |
| Extracted Pattern A' + Non-Extracted Pattern E' | 0.69 | 0.95×0.9 | 0.12 | 0.07 | 0.064 | 0.005 | 0.49 | 0.0009 |
| Extracted Pattern A'+C' | 0.69 | 0.95 | | 0.16 | 0.096 | 0.016 | 0.70 | 0.0044 |
| Non-Extracted Pattern F' + Extracted Pattern A' | 0.67×0.9 | | 0.12 | 0.07 | 0.096 | 0.007 | 0.70 | 0.0019 |
| Extracted Pattern A' + Non-Extracted Pattern G' | 0.69 | 0.60×0.9 | | 0.37 | 0.144 | 0.054 | 1.20 | 0.0258 |
| Extracted Pattern D' | 0.60 | | | 0.60 | 0.144 | 0.086 | 1.00 | 0.0346 |

☐ : Region O,  ▨ : Region P

FIG.10

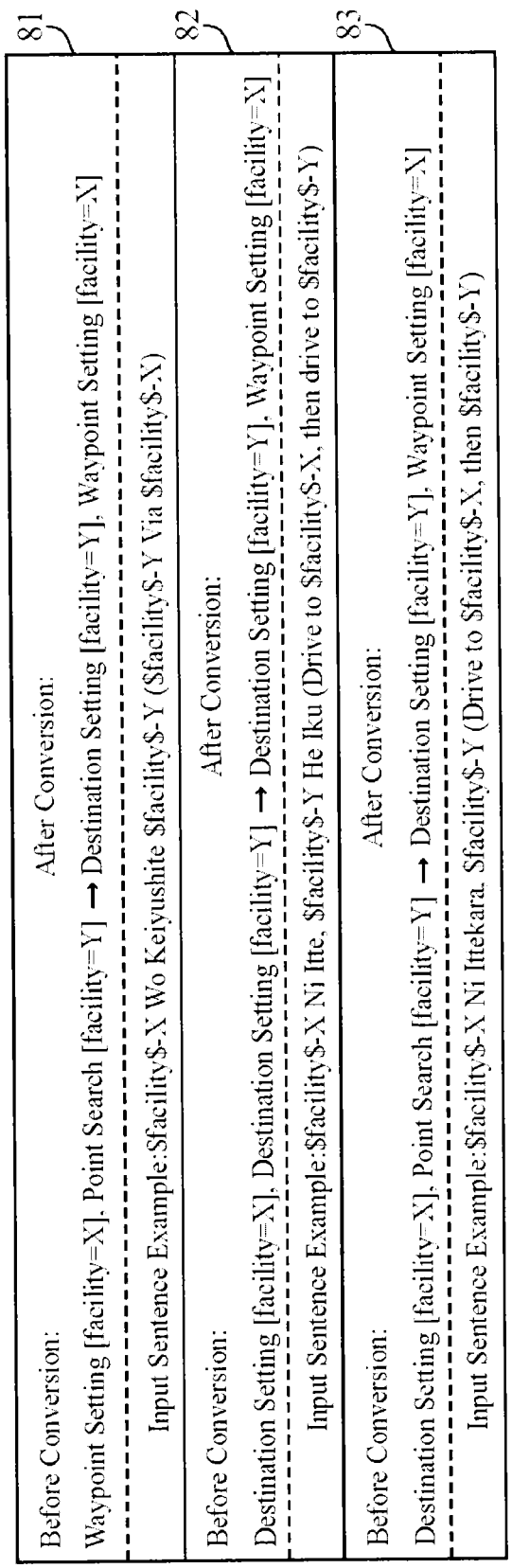

| | |
|---|---|
| Before Conversion: | After Conversion: |
| Waypoint Setting [facility=X]. Point Search [facility=Y] | Destination Setting [facility=Y]. Waypoint Setting [facility=X] |
| Input Sentence Example:$facility$-X Wo Keiyushite $facility$-Y ($facility$-Y Via $facility$-X) | |
| Before Conversion: | After Conversion: |
| Destination Setting [facility=X]. Destination Setting [facility=Y] | Destination Setting [facility=Y]. Waypoint Setting [facility=X] |
| Input Sentence Example:$facility$-X Ni Itte, $facility$-Y He Iku (Drive to $facility$-X, then drive to $facility$-Y) | |
| Before Conversion: | After Conversion: |
| Destination Setting [facility=X]. Point Search [facility=Y] | Destination Setting [facility=Y]. Waypoint Setting [facility=X] |
| Input Sentence Example:$facility$-X Ni Ittekara, $facility$-Y (Drive to $facility$-X, then $facility$-Y) | |

FIG.13

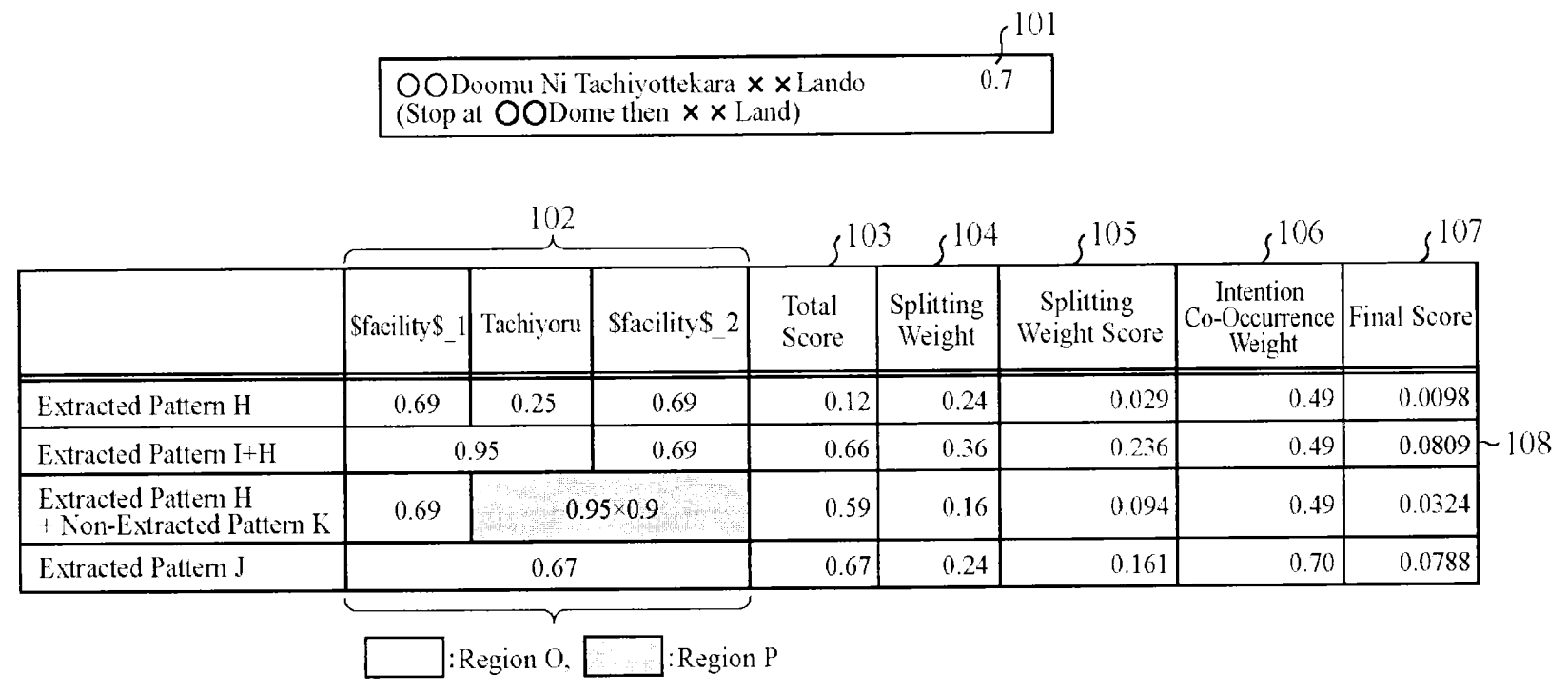

○○Doomu Ni Tachiyottekara ××Lando  0.7
(Stop at ○○Dome then ××Land)

| | $facility$_1 | Tachiyoru | $facility$_2 | Total Score | Splitting Weight | Splitting Weight Score | Intention Co-Occurrence Weight | Final Score |
|---|---|---|---|---|---|---|---|---|
| Extracted Pattern H | 0.69 | 0.25 | 0.69 | 0.12 | 0.24 | 0.029 | 0.49 | 0.0098 |
| Extracted Pattern I+H | 0.95 | | 0.69 | 0.66 | 0.36 | 0.236 | 0.49 | 0.0809 |
| Extracted Pattern H + Non-Extracted Pattern K | 0.69 | 0.67 | 0.95×0.9 | 0.59 | 0.16 | 0.094 | 0.49 | 0.0324 |
| Extracted Pattern J | | | | 0.67 | 0.24 | 0.161 | 0.70 | 0.0788 |

☐ : Region O,  ☐ : Region P

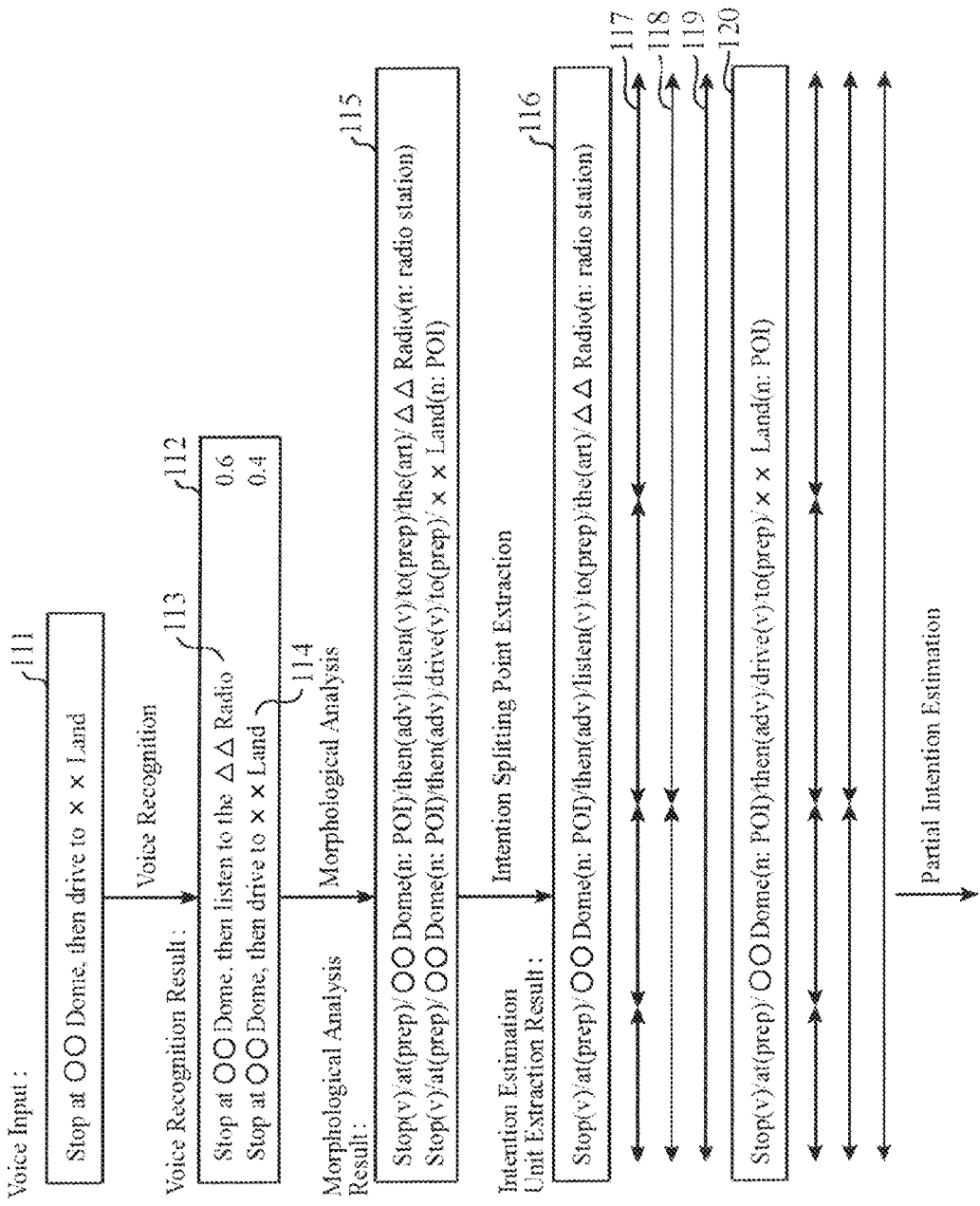

FIG.16

Partial Intention Estimation Result :

| Weight Used for Splitting | stop | $facility$_1 = ○○ Dome | listen | $radio station$_1 = △△ Radio (121) |
|---|---|---|---|---|
| Extracted Pattern a | | ▲₀.₄ | ▲₀.₆ | ▲₀.₄ 127 |
| | | Waypoint Setting [ ] 0.25 | Facility Search [facility=$facility$_1] 0.69 | Music Play [ ] 0.11 | Radio Play [target=$radio station$_1] 0.83 |
| Extracted Pattern b | Waypoint Setting [facility=$facility$_1] 0.95 122 | | | |
| Non-Extracted Pattern e | | | | |
| Extracted Pattern c | 125 Facility Search [facility=$facility$_1] 0.55 | | Radio Play [target=$radio station$_1] 0.96 | 123 |
| Non-Extracted Pattern f | 126 Waypoint Setting [facility=$facility$_1] 0.67 | | | |
| Non-Extracted Pattern g | | | Radio Play [target=$radio station$_1] 0.92 | |
| Extracted Pattern d | | | Radio Play [target=$radio station$_1] 0.92 | 124 |

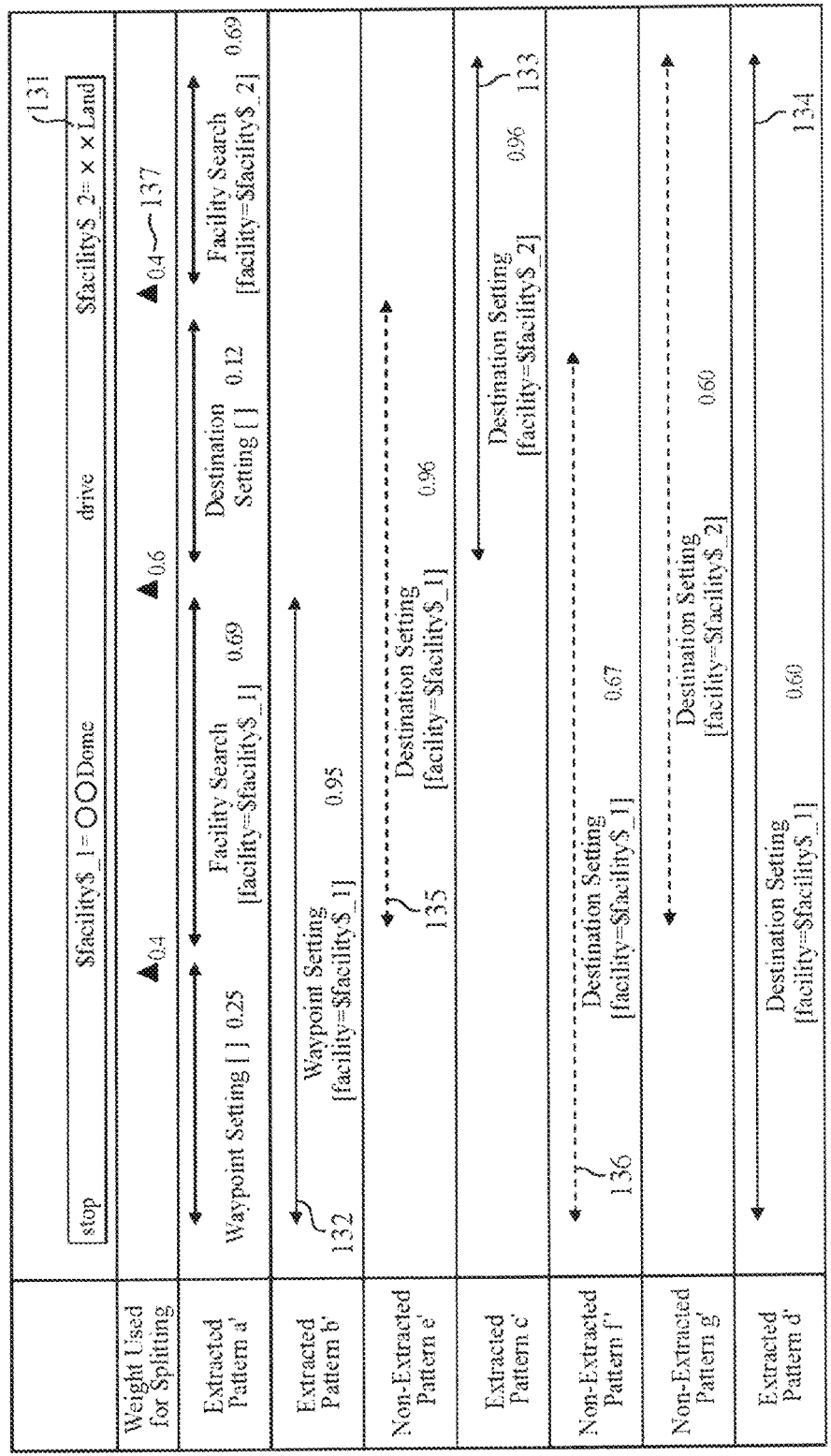

FIG. 18

Stop at ○○Dome, then listen to the △△Radio  0.6

| | stop | $facility S_1 | listen | $radio station S_1 | Total Score | Splitting Weight | Splitting Weight Score | Intention Co-Occurrence Weight | Final Score |
|---|---|---|---|---|---|---|---|---|---|
| Extracted Pattern a | 0.25 | 0.69 | 0.11 | 0.83 | 0.02 | 0.096 | 0.002 | 0.11 | 0.0001 |
| Extracted Pattern b+a | | 0.95 | 0.11 | 0.83 | 0.09 | 0.144 | 0.012 | 0.15 | 0.0011 |
| Extracted Pattern b+c | | 0.95 | | 0.96 | 0.91 | 0.216 | 0.197 | 0.50 | 0.0891 |
| Extracted Pattern a + Non-Extracted Pattern e | 0.25 | 0.95 0.9 | 0.83 0.9 | 0.83 | 0.10 | 0.064 | 0.007 | 1.90 | 0.0059 |
| Extracted Pattern a+c | 0.25 | 0.69 | | 0.96 | 0.17 | 0.096 | 0.016 | 0.35 | 0.0033 |
| Non-Extracted Pattern f + Extracted Pattern a | 0.25 | 0.67 0.9 | 0.92 0.9 | 0.83 | 0.07 | 0.096 | 0.007 | 0.30 | 0.0012 |
| Extracted Pattern a + Non-Extracted Pattern g | 0.25 | | 0.92 0.9 | | 0.21 | 0.144 | 0.030 | 0.30 | 0.0054 |
| Extracted Pattern d | | 0.92 | | | 0.92 | 0.144 | 0.132 | 1.00 | 0.0795 |

☐ : Region O,  ▨ : Region P

FIG. 19

Stop at ○○ Dome, then drive to ×× Land — 0.4 (151)

| | stop | $facility$_1 | drive | $facility$_2 | Total Score (152) | Splitting Weight (153) | Splitting Weight Score (154) | Intention Co-Occurrence Weight (155) | Final Score (156) |
|---|---|---|---|---|---|---|---|---|---|
| Extracted Pattern a' | 0.25 | 0.69 | 0.12 | 0.69 | 0.01 | 0.096 | 0.001 | 0.49 | 0.0003 |
| Extracted Pattern b'+a' | | 0.95 | 0.12 | 0.69 | 0.08 | 0.144 | 0.011 | 0.49 | 0.0022 |
| Extracted Pattern b'+c' | | 0.95 | | 0.95 | 0.90 | 0.216 | 0.195 | 1.20 | 0.0936 (157) |
| Extracted Pattern a' + Non-Extracted Pattern e' | 0.25 | 0.66→0.9 | | 0.69 | 0.15 | 0.064 | 0.010 | 0.49 | 0.0019 |
| Extracted Pattern a'+c' | 0.25 | 0.69 | | 0.95 | 0.16 | 0.096 | 0.016 | 0.70 | 0.0044 |
| Non-Extracted Pattern f' → Extracted Pattern a' | 0.25 | 0.66→0.9 | 0.66→0.9 | 0.69 | 0.42 | 0.096 | 0.040 | 0.70 | 0.0112 |
| Extracted Pattern a' + Non-Extracted Pattern g' | 0.25 | | 0.66→0.9 | | 0.14 | 0.144 | 0.019 | 1.20 | 0.0093 |
| Extracted Pattern d' | 0.60 | | | | 0.60 | 0.144 | 0.086 | 1.00 | 0.0344 |

☐ : Region O,   ▨ : Region P

FIG.22

Stop at ○○Dome then ×× Land | 0.7

| | stop | Sfacility S_1 | Sfacility S_2 | Total Score | Splitting Weight | Splitting Weight Score | Intention Co-Occurrence Weight | Final Score |
|---|---|---|---|---|---|---|---|---|
| Extracted Pattern h | 0.25 | 0.69 | 0.69 | 0.12 | 0.24 | 0.029 | 0.49 | 0.0098 |
| Extracted Pattern i+h | | 0.95 | 0.69 | 0.66 | 0.36 | 0.236 | 0.49 | 0.0809 |
| Extracted Pattern h + Non-Extracted Pattern k | 0.25 | | 0.63×0.9 | 0.14 | 0.16 | 0.023 | 0.49 | 0.0078 |
| Extracted Pattern j | | | 0.67 | 0.67 | 0.24 | 0.161 | 0.70 | 0.0788 |

☐ :Region O.  ▨ :Region P

INTENTION ESTIMATING DEVICE AND INTENTION ESTIMATING METHOD

FIELD OF THE INVENTION

The present invention relates to an intention estimating device for and an intention estimating method of estimating to which one of intentions designed beforehand the contents of a text inputted in a natural language correspond.

BACKGROUND OF THE INVENTION

In recent years, a method of accepting, as a voice input, a language which a human being speaks, and then performing an operation by using a result of recognition of the input has captured a spotlight. Although this technique is used as a voice interface for use in mobile phones, car navigation, and so on, there is, as a basic method, a method of defining a correspondence between voice recognition results, which are assumed in advance by the system, and operations, and performing an operation when a voice recognition result is an assumed one. Because this method makes it possible for the user to directly perform an operation by uttering a voice, as compared with a conventional manual operation, the method works effectively as a shortcut function. On the other hand, the user needs to utter words for which the system is waiting in order to perform an operation, the number of words which the user should memorize increases with increase in the number of functions which the system handles. A further problem is that in general, there are few users who use the system after sufficiently understanding the instruction manual, and, as a result, there is a case in which the user does not understand how the user needs to utter in order to perform any of many operations, and cannot actually operate any operation other than limited functions by uttering a voice.

As a solution to the problem, a method of understanding a user's intention from the user's utterance and performing an operation, instead of connecting a voice recognition result directly with an operation, is disclosed. As one example of implementing the method, there is an example of defining a correspondence between uttered example sentences, which are collected in advance, and operations (referred to as learned data from here on), modeling operations (referred to as intentions from here on) which the user desires from the user's words by using a statistical learning method, and estimating an intention for a user input by using this model (referred to as a statistical intention estimation from here on). In a concrete process of the statistical intention estimation, terms which are used for learning are extracted first from the uttered example sentences of the learned data. Then, the term set and the correct intention are defined as input learned data, and the weight between each of the terms and the correct intention is learned according to a statistical learning algorithm and a model is outputted.

As terms which are used for learning, there are typically words and word strings which are extracted from data acquired by carrying out a morphological analysis on uttered example sentences. For example, from an uttered example sentence " ○○駅に行きたい (OOeki ni ikitai (Drive to OO station))", the following morphological analysis result: "○○駅 (OOeki) (proper noun, facility)/ に (ni) (particle)/ 行き (iki) (verb, continuative form)/ たい (tai) (auxiliary verb)" is acquired. When the morphological analysis result is acquired, a term such as "$facility$, 行く (iku)" (a facility having a proper noun is converted into a special symbol $facility$, and a verb is converted into its infinitive), and a two-contiguous-morpheme term such as "$facility$_ に (ni), に_行き (ni_iki), 行き_たい (iki_tai)" is extracted.

As a result, for the terms "$facility$, 行く (iku), $facility$_ に (ni), に_行き (ni_iki), 行き_たい (iki_tai)", a correct intention which is expressed as "destination_setting [destination=$facility$]" (a main intention is a destination setting, and a destination to be set is $facility$) is generated, and a model is generated on the basis of term sequences generated from a large volume of utterance data and the learned data which consist of correct intentions. As a method for generating a model, a machine learning algorithm is used. According to the machine learning algorithm, machine learning is performed on the weight between an input term and a correct intention in such a way that the largest number of correct intentions can be generated for every of the learned data. Therefore, for a term set acquired from an utterance similar to learned data, a model with a high possibility of outputting a correct intention is acquired. As this machine learning method, for example, a maximum entropy method can be used.

Because a user's operation intention can be estimated with flexibility even for an input which is not a preassumed one by estimating an intention corresponding to the user's input by using a model generated according to such a machine learning algorithm as above, the intention can be understood appropriately and the operation can be performed even if the input is an utterance of a user who does not remember its regular expression. On the other hand, the acceptance of such a free input improves the flexibility of the system and increases the possibility that the user makes still more various utterances.

The assumed various utterances are roughly split into the following two groups.

(a) Inputs each using still more various words for a single operation, (b) Inputs each of which is a request consisting of a plurality of operations and made as a batch.

In the case of above-mentioned (a), various utterances can be processed by further increasing the learned data. In contrast, in the case of (b), because each learned data is brought into correspondence with a single intention from the first, when a request includes a plurality of intentions, a process of combining appropriate intentions cannot be performed.

To solve this problem, patent reference 1 discloses a speaking intention recognition device that determines a sequence of appropriate intentions for an input including one or more intentions by using a model which has been learned as single intentions. This speaking intention recognition device prepares, as learned data, morpheme strings which serve as separators of intentions for input morphemes in advance, estimates splitting points at each of which the input can be split, like in the case of the above-mentioned understanding of intentions, and multiplies the possibility of splitting the input at each splitting point and the probability of intention of each split element to estimate a most likelihood intention sequence.

RELATED ART DOCUMENT

Patent Reference

Patent reference 1: Japanese Unexamined Patent Application Publication No. 2000-200273

SUMMARY OF THE INVENTION

Problems to be Solved by the Invention

However, the technique disclosed by above-mentioned patent reference 1 simply provides splitting point candidates as learned data for each morpheme string, learns the possibility of each splitting point candidate, and performs an estimation of splitting points for an actual user input. Therefore, it is considered that it is difficult to collect various inputs as data for learning those splitting points, and the technique only predicts splitting points as a morpheme string in learned data substantially, and there is not much difference between the conventional technique and a case of determining the possibility of splitting points on the basis of the linguistic characteristics.

Therefore, a problem is that the estimation of a plurality of intentions on the basis of splitting points is none other than selecting a most likelihood intention as a result of having estimated individually correct intentions for partial inputs after splitting in addition to the correctness of each splitting point, and returning an intention sequence of the intentions connected to each other, and the validity of the plurality of intentions in the entire utterance is not verified.

This means that no evaluation regarding the continuity of intentions is made, and an appropriate intention sequence cannot be acquired for reasons (c) to (e) which will be shown below.

(c) When a large volume of learned data cannot be prepared, there is a possibility that the precision of the entire intention sequence also becomes low because the accuracy of intention estimation becomes low.

(d) Because there is a case in which a subsequent utterance is omitted from the input in response to a forward portion of this input, the intention of the subsequence utterance may not match the user's intention sequence in that case.

(e) Because a result of voice recognition is provided as the input when the input is a voice, a mistake in estimation in a case of including misrecognition cannot be eliminated from the consistency between intentions.

The present invention is made in order to solve the above-mentioned problems, and it is therefore an object of the present invention to describe a relationship between intentions in advance, thereby generating a best-suited intention sequence on the basis of the relationship between intentions even in a case in which an input including a plurality of intentions is made.

Means for Solving the Problem

In accordance with the present invention, there is provided an intention estimating device includes: an intention estimation unit extractor that extracts one or more intention estimation units each of which is a unit on which an estimation of the intention is to be performed from an inputted language; an intention estimator that estimates a partial intention which is an intention of a part which constructs each of the intention estimation units extracted by the intention estimation unit extractor from each of the intention estimation units; and an intention co-occurrence weight calculator that calculates an intention co-occurrence weight based on a relationship between the partial intentions estimated by the intention estimator, in which the intention estimating device includes an intention sequence estimator that generates an intention sequence corresponding to the inputted language by using one or more partial intentions estimated by the intention estimator, and generates an intention estimation result corresponding to the inputted language by using both a score showing a likelihood of the generated intention sequence and an intention co-occurrence weight which the intention co-occurrence weight calculator calculates for the partial intentions which construct the generated intention sequence.

Advantages of the Invention

In accordance with the present invention, the intention estimating device can generate a best-suited intention sequence on the basis of a relationship among a plurality of intentions even when an input including the above-mentioned plurality of intentions is made.

BRIEF DESCRIPTION OF THE FIGURES

FIG. 7 is a diagram showing the process performed by the intention sequence estimator of the intention estimating device in accordance with Embodiment 1;

FIG. 10 is ae diagram showing an example of an intention sequence conversion table which an intention sequence conversion table storage of the intention estimating device in accordance with Embodiment 2 stores;

FIG. 13 is a diagram showing a process performed by an intention sequence estimator of the intention estimating device in accordance with Embodiment 2;

FIG. 15 is a diagram showing a concrete example of a process of extracting intention estimation units from an input voice inputted to the intention estimating device in accordance with Embodiment 3;

FIG. 16 is a diagram showing a process performed by an intention estimator of the intention estimating device in accordance with Embodiment 3;

FIG. 17 is a diagram showing the process performed by the intention estimator of the intention estimating device in accordance with Embodiment 3;

FIG. 18 is a diagram showing a process performed by an intention sequence estimator of the intention estimating device in accordance with Embodiment 3;

FIG. 19 is a diagram showing the process performed by the intention sequence estimator of the intention estimating device in accordance with Embodiment 3;

FIG. 22 is a diagram showing a process performed by an intention sequence estimator of the intention estimating device in accordance with Embodiment 4.

EMBODIMENTS OF THE INVENTION

Hereafter, in order to explain this invention in greater detail, the preferred embodiments of the present invention will be described with reference to the accompanying drawings.

Embodiment 1

Hereafter, an explanation will be made by taking, as an example, an intention estimating device which is applied to a navigation system. Hereafter, an operation which corresponds to a language uttered or inputted by a user and which the user desires will be referred to as an "intention."

Figure 1:
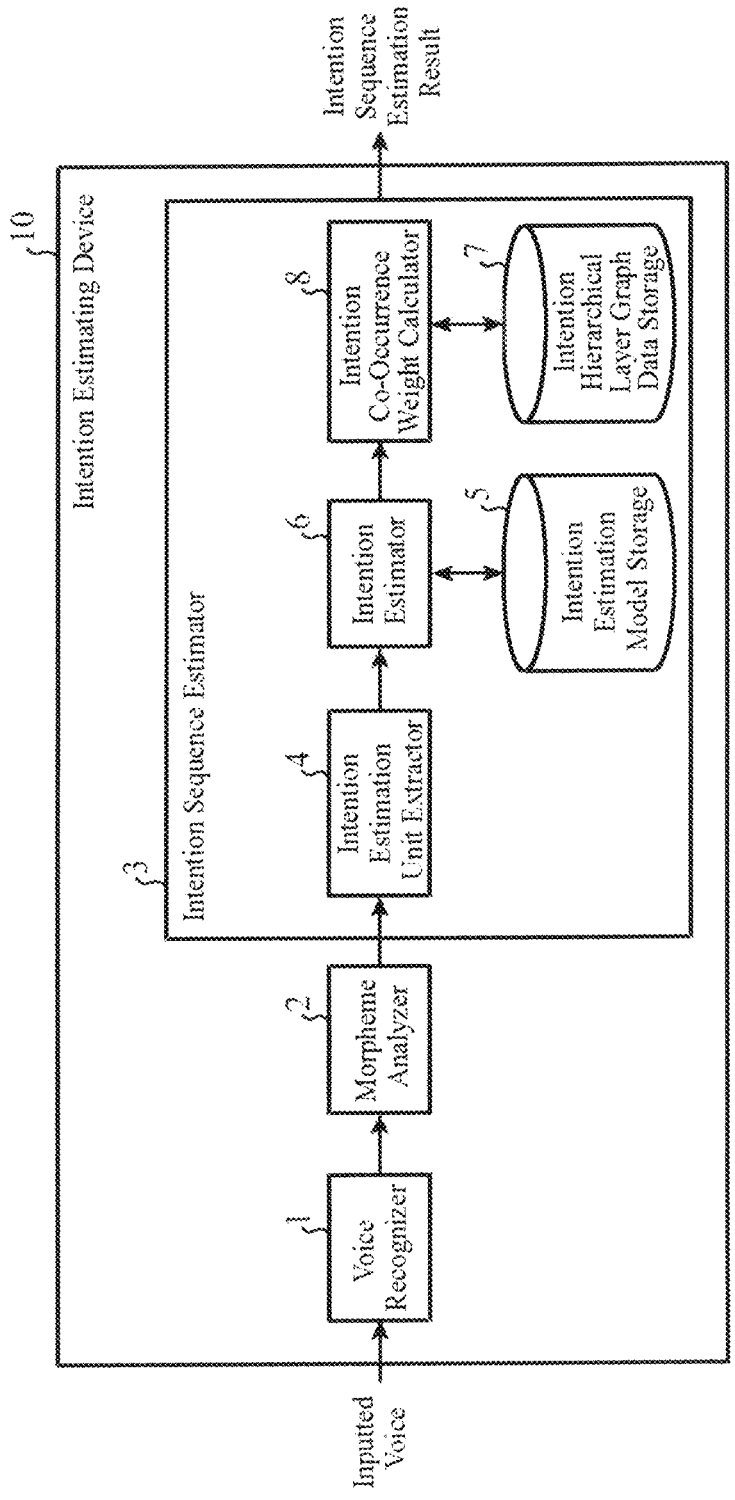
FIG. 1 is a block diagram showing the structure of an intention estimating device in accordance with Embodiment 1.

FIG. 1 is a block diagram showing the structure of an intention estimating device in accordance with Embodiment 1.

The intention estimating device 10 is comprised of a voice recognizer 1, a morpheme analyzer 2, and an intention sequence estimator 3. Further, the intention sequence estimator 3 includes an intention estimation unit extractor 4, an intention estimation model storage 5, an intention estimator 6, an intention hierarchical layer graph data storage 7, and an intention co-occurrence weight calculator 8.

The voice recognizer 1 carries out a voice recognition process on an input voice inputted to the intention estimating device 10, and returns a voice recognition result. The morpheme analyzer 2 receives the voice recognition result as an input, carries out a morphological analysis on this input, and returns a morphological analysis result. The intention estimation unit extractor 4 estimates positions where the morphological analysis result should be split as intention estimation units from the morphological analysis result, splits this morphological analysis result into partial morphemes, and extracts intention estimation units on the basis of syntactic constraints on the language. The intention estimation model storage 5 is a database that stores an intention estimation model which is referred to when an intention estimation is carried out. The intention estimator 6 refers to the intention estimation model stored in the intention estimation model storage 5, and outputs a partial intention estimation result and a partial score for each of the intention estimation units which are split by the intention estimation unit extractor 4.

The intention hierarchical layer graph data storage 7 is a database that stores intention hierarchical layer graph data which are referred to when the validity of an intention sequence is calculated. The intention co-occurrence weight calculator 8 refers to the intention hierarchical layer graph data stored in the intention hierarchical layer graph data storage 7 to calculate an intention co-occurrence weight showing the validity of an intention sequence which is partial intention estimation results estimated by the intention estimator 6. At this time, intention co-occurrence shows a case in which a plurality of intentions are estimated for the input, and an intention co-occurrence weight is a value showing the validity of each of the plurality of estimated intentions. The intention sequence estimator 3 acquires intention sequence estimation results and final scores for the morphological analysis result inputted from the morpheme analyzer 2 on the basis of the output results of the intention estimation unit extractor 4, the intention estimator 6, and the intention co-occurrence weight calculator 8, and outputs an intention sequence estimation result with a final score, this result being best suited to the input voice.

Figure 2:
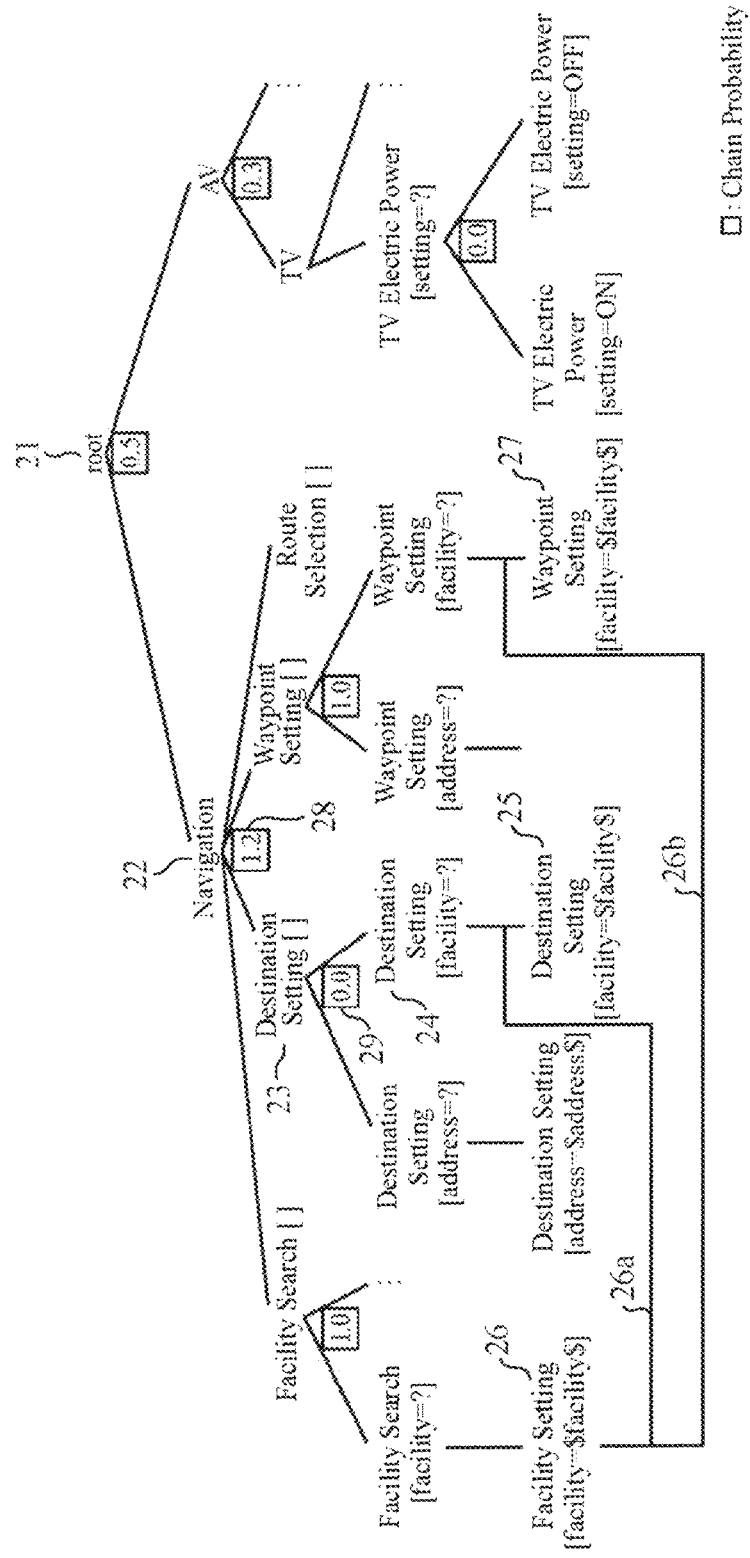
FIG. 2 is a diagram showing an example of intention hierarchical layer graph data which an intention hierarchical layer graph data storage of the intention estimating device in accordance with Embodiment 1 stores.

FIG. 2 is a diagram showing an example of the intention hierarchical layer graph data which the intention hierarchical layer graph data storage 7 of the intention estimating device in accordance with Embodiment 1 stores.

In the intention hierarchical layer graph data, intention nodes 21 to 27, a hierarchical relationship among the intention nodes 21 to 27, and intention co-occurrence weights 28 and 29 each showing a result of digitization of the intention co-occurrence weight of child nodes are shown. For example, in the case of the intention node 21, a child node represents the intention node 22 which is located in a hierarchical layer lower by one than this intention node 21.

The intention hierarchical layer graph data have a structure in which a virtual intention node is fundamentally defined as the top and functions are hierarchized, and show intentions which become more concrete as they are located in lower hierarchical layers. In the example of FIG. 2, the intention node 21 which is the virtual "root" is defined as the top, the intention node 23 in a lower hierarchical layer is "destination_setting[ ]", the intention node 24 in a hierarchical layer further lower by one is "destination_setting [facility=?]", and the intention node 25 in a hierarchical layer further lower by one is "destination_setting [facility=$facility$]." The intention node 23 shows a state in which a destination setting is performed, but no setting conditions are determined, the intention node 24 shows a state in which a destination setting is performed by using the name of a facility, but a concrete facility name is not determined, and the intention node 25 shows a state in which a concrete facility name is assigned to "$facility$" and a destination setting is performed by using the concrete facility name.

On the other hand, a path 26a of the graph (referred to as a graph path from here on) from "facility_search [facility=$facility$]" which is the intention node 26 to "destination_setting[facility=$facility$]" which is the intention node 25, and a graph path 26b from "facility_search [facility=$facility$]" which is the intention node 26 to "waypoint_setting[facility=$facility$]" which is the intention node 27 are generated on the basis of the assumed functions of a car navigation application. The intention node 26 "facility_search[facility=$facility$]" shows that a request for only search of the concrete facility "$facility$", while the graph path 26*a* to the intention node 25 "destination_setting [facility=$facility$]" and the graph path 26*b* to the intention node 27 "waypoint_setting[facility=$facility$]" show that it is necessary to finally select intentions, such as a destination setting and a waypoint setting, as the application.

Further, the intention co-occurrence weight 28 shows "1.2", and shows that the intention co-occurrence weight at the time when a plurality of intentions at child nodes or at nodes in lower hierarchical layers than the child nodes appear is "1.2." More specifically, the weight shows that no problem arises even if a plurality of intentions appear together, and further shows that the frequency with which a plurality of intentions appear together is high. In contrast, the intention co-occurrence weight 29 shows "0.0", and shows that the intention co-occurrence weight at the time when a plurality of intentions at child nodes or at nodes in lower hierarchical layers than the child nodes appear is "0.0." More specifically, the weight shows that a plurality of intentions do not appear together.

Figure 3:
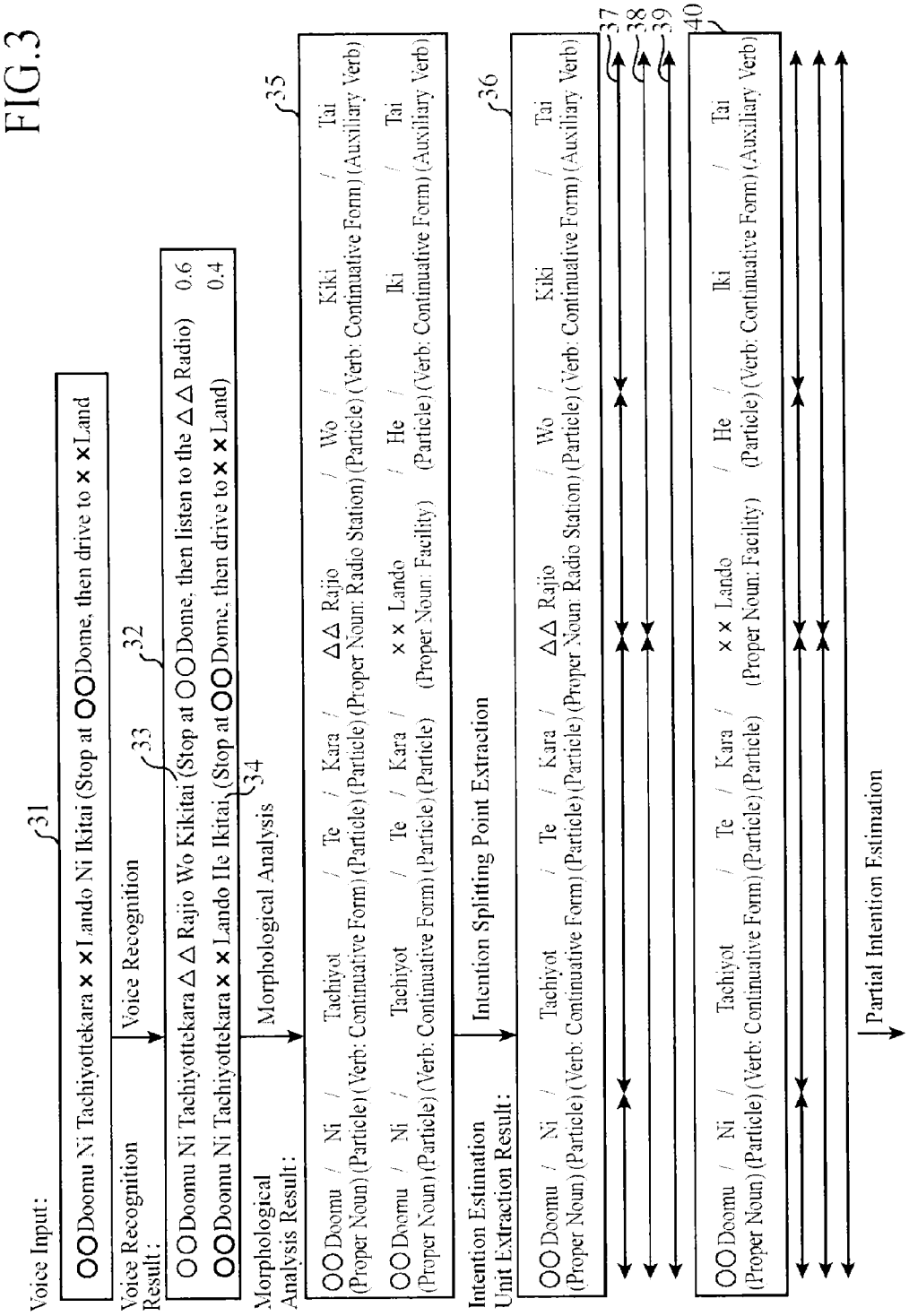
FIG. 3 is a diagram showing a concrete example of a process of extracting intention estimation units from an input voice inputted to the intention estimating device in accordance with Embodiment 1.

FIG. 3 is a diagram showing a concrete example of the process of extracting intention estimation units from the input voice inputted to the intention estimating device in accordance with Embodiment 1.

The input voice 31 shows that the user utters, as an input example, "○○ドームに立ち寄ってから、××ランドに行きたい (OO doomu ni tachiyottekara, xx lando ni ikitai (Stop at OO Dome, then drive to xx Land))." A voice recognition result 32 is a result which the voice recognizer 1 acquires by carrying out a voice recognition on the input voice 31. Concretely, the voice recognition result consists of a voice recognition result example 33 of "○○ドームに立ち寄ってから△△ラジオを聞きたい (OO doomu ni tachiyottekara, ΔΔ rajio wo kikitai (Stop at OO Dome, then listen to the ΔΔ Radio))" which is determined with a voice recognition score of "0.6" being provided, and a voice recognition result example 34 of "○○ドームに立ち寄ってから、××ランドに行きたい (OO doomu ni tachiyottekara, xx lando ni ikitai (Stop at OO Dome, then drive to xx Land))" which is determined with a voice recognition score of "0.4" being provided.

A morphological analysis result 35 is a result which the morpheme analyzer 2 acquires by carrying out a morphological analysis on the voice recognition result 32. Intention estimation unit extraction results 36 and 40 are results which the intention estimation unit extractor 4 acquires by extracting intention estimation units from the morphological analysis result 35 on the basis of syntactic constraints on the language. In the intention estimation unit extraction result 36, three extracted patterns 37, 38, and 39 are shown. As shown in FIG. 3, when the language is Japanese, each clause is defined as a minimum intention estimation unit from a characteristic of an attached word string being attached to an independent word, and each compounded clause is further extracted as an intention estimation unit from a characteristic of a forward-placed indeclinable part of speech having a dependency relation with a backward-placed declinable word. The intention estimation result extraction units shown in the extracted patterns 37, 38, and 39 are results of extracting only patterns for which a dependency structure explained above is established.

After that, the intention estimator 6 refers to each extracted pattern of the intention estimation unit extraction results 36 and 40 to estimate a partial intention of each extracted pattern by using the intention estimation model and calculate a partial score. Concrete processed results acquired by the above-mentioned intention estimator 6 are shown in FIGS. 4 and 5.

Figure 4:
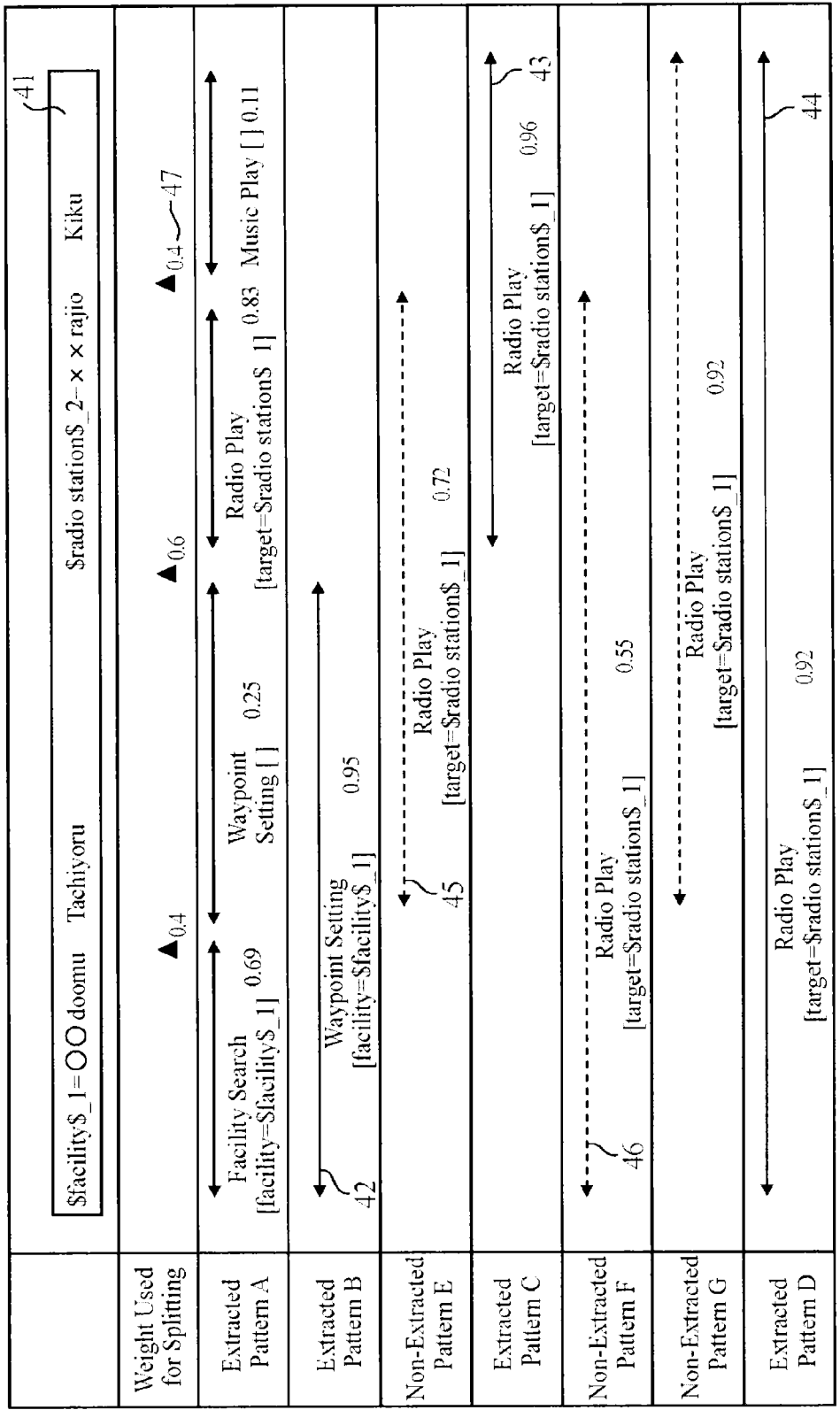
FIG. 4 is a diagram showing a process performed by an intention estimator of the intention estimating device in accordance with Embodiment 1.
Figure 5:
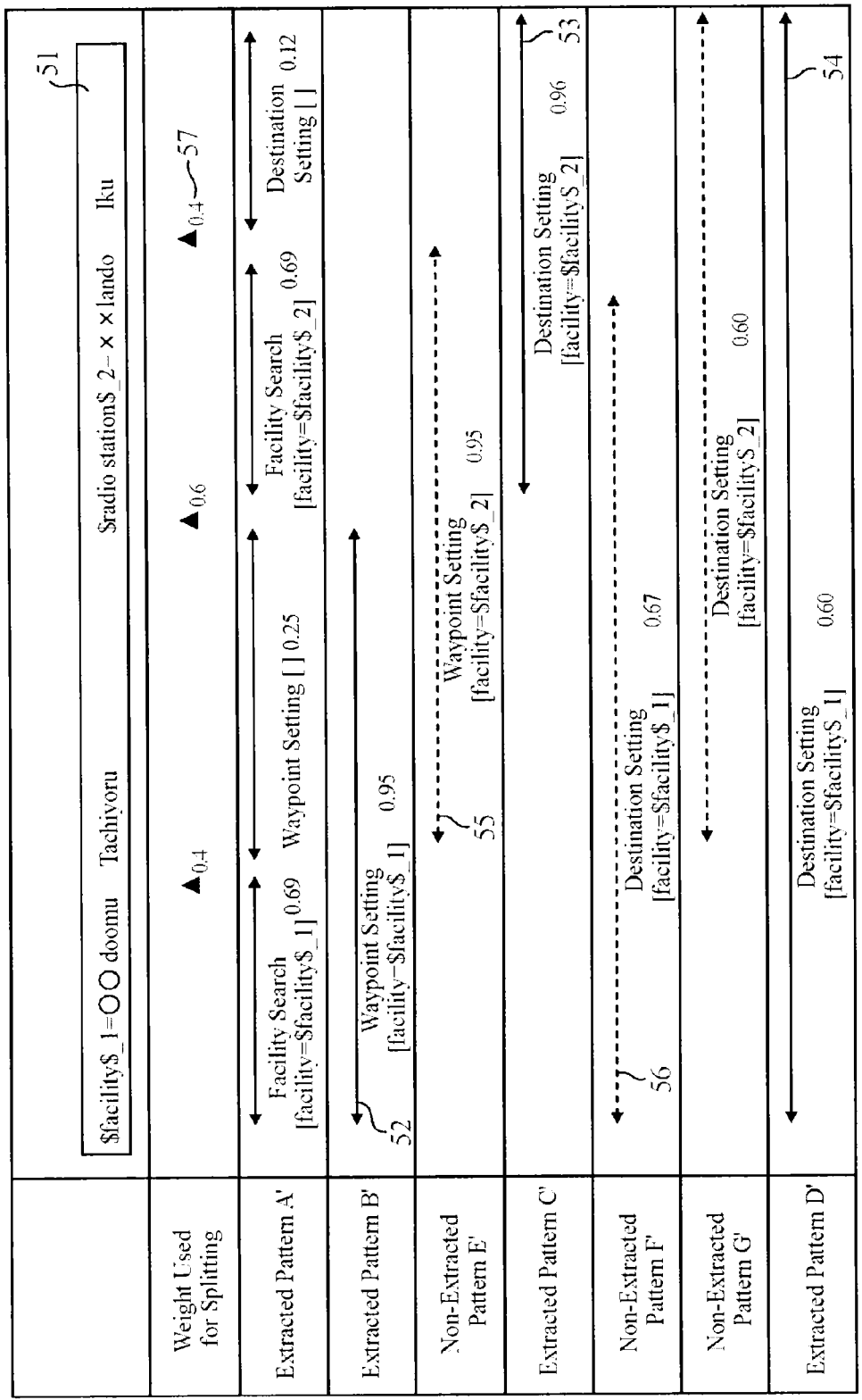
FIG. 5 is a diagram showing the process performed by the intention estimator of the intention estimating device in accordance with Embodiment 1.

FIGS. 4 and 5 are diagrams showing the process carried out by the intention estimator 6 of the intention estimating device in accordance with Embodiment 1. In further detail, FIG. 4 shows an estimation of partial intentions on the basis of the intention estimation unit extraction result 36 shown in FIG. 3, and FIG. 5 shows an estimation of partial intentions on the basis of the intention estimation unit extraction result 40 shown in FIG. 3.

A case of extracting the basic forms of independent words as terms will be explained with reference to FIGS. 4 and 5. First, the estimating process of estimating partial intentions will be explained with reference to FIG. 4.

A term sequence 41 shows a term sequence which is generated from the intention estimation unit extraction result 36 and which is used for an estimation of partial intentions, and shows that "$facility$_1" is generated for "○○ドーム／に (OO doomu/ni)", "立ち寄る (tachiyoru)" is generated for "立ち寄っ／て／から (tachiyot/te/kara)", "$radio_station$_1" is generated for "××ラジオ／を (xx rajio/wo)", and "聞く (kiku)" is generated for "聞き／たい (kiki/tai)."

In addition, in FIG. 4, weights used for splitting and a plurality of extracted patterns are shown for the term sequence 41. In the example of FIG. 4, as the extracted patterns, extracted patterns A, B, C, and D and non-extracted patterns E, F, and G which are based on the extracted patterns 37, 38, and 39 shown in FIG. 3 are shown. Each of solid line arrows 42, 43, and 44 shows the range of an intention estimation unit extracted by the intention estimation unit extractor 4. Further, below each of the above-mentioned solid line arrows 42, 43, and 44, a partial intention which is a result estimated by the intention estimator 6, and the partial score of this estimated partial intention are shown. Further, each of dotted line arrows 45 and 46 shows the range in which nothing is extracted by the intention estimation unit extractor 4. Below each of the above-mentioned dotted line arrows 45 and 46, a partial intention which is a result estimated by the intention estimator 6, and the partial score of this estimated partial intention are described. In addition, each of the weights used for splitting point 47 described below the term sequence 41 is a numerical value by which the score is multiplied when each specified position is used as a point for splitting into intention estimation units. In contrast, when each specified position is not used as a point for splitting into intention estimation units, a value which is acquired by subtracting the above-mentioned weight used for splitting point 47 from 1 is a numerical value by which the score is multiplied.

Next, the estimating process of estimating partial intentions will be explained with reference to FIG. 5.

A term sequence 51 shows a term sequence which is generated from the intention estimation unit extraction result 40 and which is used for an estimation of partial intentions, and shows that "$facility$_1" is generated for "○○ドーム／に (OO doomu/ni)", "立ち寄る (tachiyoru)" is generated for "立ち寄っ／て／から (tachiyot/te/kara)", "$facility$_2" is generated for "××ランド／へ (xx lando/he)", and "行く (iku)" is generated for "行き／たい (iki/tai)."

In addition, in FIG. 5, weights used for splitting and a plurality of extracted patterns are shown for the term sequence 51. In the example of FIG. 5, as the extracted patterns, extracted patterns A', B', C', and D' and non-extracted patterns E', F', and G' which are based on the extracted patterns shown in FIG. 3 are shown. Each of solid line arrows 52, 53, and 54 shows the range of an intention estimation unit extracted by the intention estimation unit extractor 4. Further, below each of the above-mentioned solid line arrows 52, 53, and 54, a partial intention which is a result estimated by the intention estimator 6, and the partial score of this estimated partial intention are shown. Further, each of dotted line arrows 55 and 56 shows the range in which nothing is extracted by the intention estimation unit extractor 4. Below each of the above-mentioned dotted line arrows 55 and 56, a partial intention which is a result estimated by the intention estimator 6, and the partial score of this estimated partial intention are described. In addition, each of the weights used for splitting point 57 described below the term sequence 51 is a numerical value by which the score is multiplied when each specified position is used as a point for splitting into intention estimation units. In contrast, when each specified position is not used as a point for splitting into intention estimation units, a value which is acquired by subtracting the above-mentioned weight used for splitting point 57 from 1 is a numerical value by which the score is multiplied.

Next, the intention sequence estimator 3 generates combinations of the partial intention estimation results for the voice recognition result examples 33 and 34 by using the partial intention estimation results estimated by the intention estimator 6, and calculates a final score of each of the combinations. Concrete processed results acquired by the intention sequence estimator 3 are shown in FIGS. 6 and 7.

Figure 6:
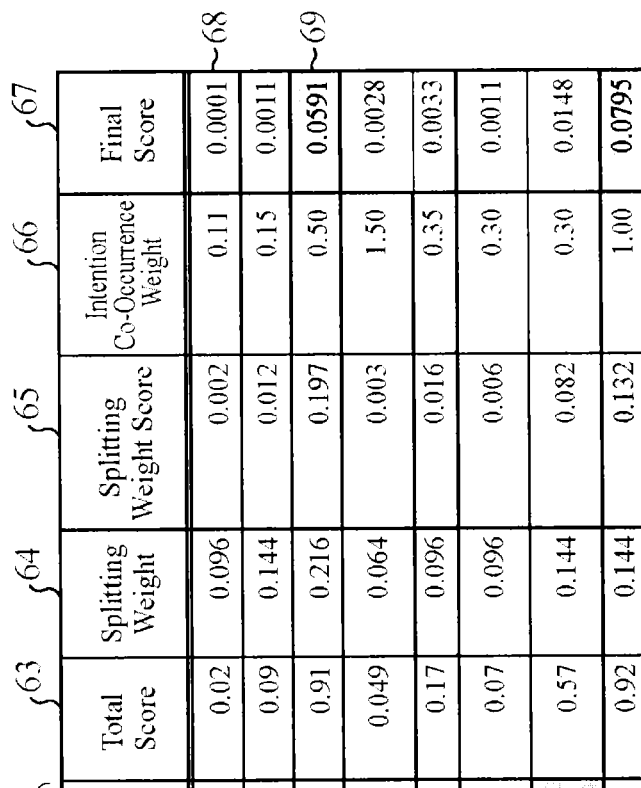
FIG. 6 is a diagram showing a process performed by an intention sequence estimator of the intention estimating device in accordance with Embodiment 1.

FIGS. 6 and 7 are diagrams showing the process carried out by the intention sequence estimator 3 of the intention estimating device in accordance with Embodiment 1. In further detail, FIG. 6 shows an example of the calculation of final scores on the basis of combinations of the partial intention estimation results shown in FIG. 4, and FIG. 7 shows an example of the calculation of final scores on the basis of combinations of the partial intention estimation results shown in FIG. 5.

Each final score is calculated by multiplying the partial scores for the sequence of all contiguous partial intentions in each intention estimation unit by each other, and further multiplying the multiplication result by the validity of intention estimation units and the intention co-occurrence weight calculated by the intention co-occurrence weight calculator 8.

FIG. 6 shows an example of the calculation of final scores for the voice recognition result example 33, and the voice recognition score 61 of the above-mentioned voice recognition result example 33 is shown to be "0.6." Further, each partial score 62 shows the partial score of a partial intention estimation result in each extracted pattern at the time of using the term sequence 41. Each total score 63 shows the product of the partial scores of partial intention estimation results. Each splitting weight 64 shows a result of the calculation of a weight according to whether or not to use splitting points. The value of each splitting weight 64 is a numerical value showing the possibility of splitting into intentions, and the sum total of the values of the above-mentioned splitting weights 64 is "1.0." Each splitting weight score (a score showing the likelihood of an intention sequence) 65 is the product of the total score 63 and the splitting weight 64.

Each intention co-occurrence weight 66 is a numerical value which is determined from the intention hierarchical layer graph shown in FIG. 2, and a partial intention sequence. Each final score 67 is a value which is the result of multiplication of the splitting weight score 65, the voice recognition score 61, and the intention co-occurrence weight 66. An intention sequence 68 of the extracted pattern A is the one in which the final score is described in the case of splitting the voice recognition result example 33 into all the clauses as the intention sequence pattern of the voice recognition result example 33. Further, an intention sequence 69 of an extracted pattern B+C is the one in which the final score is described in the case of defining each sentence having a compound structure as a single section.

FIG. 7 shows an example of the calculation of final scores for the voice recognition result example 34, and the voice recognition score 71 of the above-mentioned voice recognition result example 34 is shown to be "0.4." Further, a term sequence 51, total scores 72, splitting weights 73, splitting weight scores 74, intention co-occurrence weights 75, and final scores 76 are the same as those in the structure explained in FIG. 6. Further, an intention sequence 77 of an extracted pattern B'+C' is the one in which the final score is described in the case of defining each sentence having a compound structure as a single section.

Figure 8:
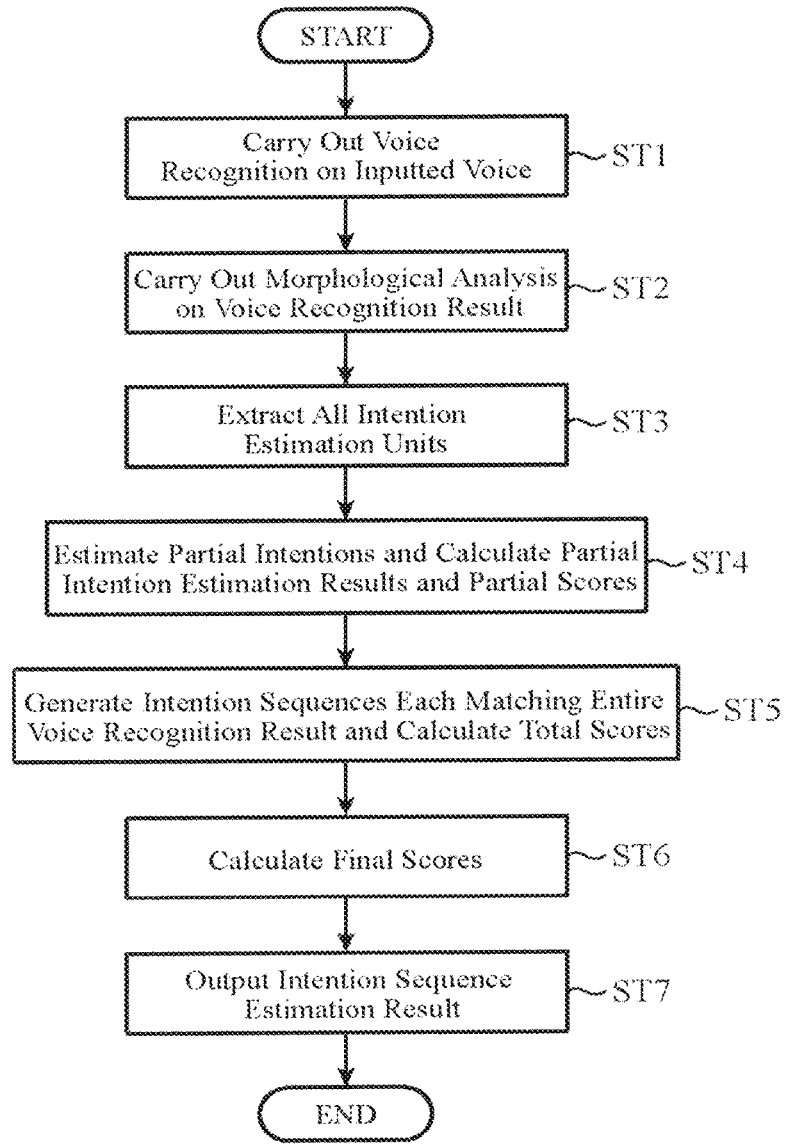
FIG. 8 is a flow chart showing the operation of the intention estimating device in accordance with Embodiment 1.

FIG. 8 is a flow chart showing the operation of the intention estimating device in accordance with Embodiment 1.

The voice recognizer 1 carries out a voice recognition on the input voice (step ST1). The morpheme analyzer 2 carries out a morphological analysis on a voice recognition result acquired in step ST1 (step ST2). The intention estimation unit extractor 4 splits a morpheme string which is a morphological analysis result acquired in step ST2 into partial morphemes, and extracts all intention estimation units each of which is unit for which an intention is estimated (step ST3). The intention estimator 6 carries out a partial intention estimation on all the intention estimation units extracted in step ST3 to acquire partial intention estimation results and partial scores (step ST4).

The intention sequence estimator 3 generates intention sequences each of which matches an entire voice recognition result by connecting partial intentions on the basis of the partial intention estimation results acquired in step ST4, and calculates a total score for each of the generated intention sequences (step ST5). Further, the intention sequence estimator 3 multiplies the total score of each of the intention sequences generated in step ST5 by the intention co-occurrence weight calculated by the intention co-occurrence weight calculator 8 and the voice recognition score to calculate a final score for each of the intention sequences (step ST6). In addition, the intention sequence estimator 3 refers to final scores calculated in step ST6, outputs the intention sequence having the largest final score as an intention sequence estimation result which is best suited to the input voice (step ST7), and ends the processing.

Next, the flow chart shown in FIG. 8 will be explained with reference to the concrete examples shown in FIGS. 2 to 7. Hereafter, an explanation will be made by assuming that an input by voice is performed. First, it is assumed that the input voice 31, shown in FIG. 3, of "○○ドームに立ち寄ってから、××ランドに行きたい (OO doumu ni tachiyottekara, xx lando ni ikitai (Stop at OO Dome, then drive to xx Land))" is inputted as the input by voice, the voice recognizer 1, as step ST1, carries out a voice recognition on the above-mentioned input voice 31, and the voice recognition result 32 is acquired. It is assumed that as the voice recognition result 32, "○○ドームに立ち

寄ってから△△ ラジオを聞きたい (OO doomu ni tachiyottekara, △△ rajio wo kikitai (Stop at OO Dome, then listen to the △△ Radio))" which is the voice recognition result example 33 is determined with a score of "0.6" being provided, and "○○ドームに、立ち寄ってから、××ランドに行きたい (OO doomu ni tachiyottekara, xx lando ni ikitai (Stop at OO Dome, then drive to xx Land))" which is the voice recognition result example 34 is determined with a score of "0.4" being provided. These voice recognition result examples 33 and 34 are outputted to the morpheme analyzer 2.

The morpheme analyzer 2, as step ST2, carries out a morphological analysis on the voice recognition result examples 33 and 34 on the basis of a known morphological analysis method to generate morphological analysis results 35 shown in FIG. 3. Although surface morphemes, parts of speech, and conjugated forms are described in the morphological analysis results 35 in the example of FIG. 3, besides these pieces of information, information including the detailed classifications of the parts of speech, the basic forms of the morphemes, and the semantic labels of the morphemes can be outputted, and it is assumed that at least the basic forms of the morphemes are included.

The morphological analysis results 35 consist of two morphological analysis result examples 36 and 40, and each of these morphological analysis result examples is outputted to the intention estimation unit extractor 4.

The intention estimation unit extractor 4, as step ST3, extracts all the intention estimation units of each of the morphological analysis result examples 36 and 40 on the basis of the syntactic characteristics of the language. For example, in the case of Japanese, a plurality of attached words are connected with an independent word to form a section having a meaning which is called a single clause. Therefore, in the case of the morphological analysis result example 36, first, the following four clauses: "○○ドーム (OO doomu) (proper noun)/に (ni) (particle)", "立ち寄っ (tachiyot) (verb: continuative form)/て (te) (particle)/から (kara) (particle)", "△△ラジオ (△△ rajio) (proper noun: radio station)/を (wo) (particle)", and "聞き (kiki) (verb: continuative form)/たい (tai) (auxiliary verb)" are extracted as intention estimation units.

Next, on the basis of the characteristic of an indeclinable part of speech having a dependency relation with a declinable word, as a syntactic constraint, a group of clauses between which a dependency relation is established is extracted as one intention estimation unit. In addition, because there is a characteristic of the attributive form of a declinable word having a dependency relation with the following indeclinable part of speech and the continuative form of a declinable word having a dependency relation with the following declinable word, an extension of intention estimation units is carried out on the basis of this characteristic. By repeating this process, morpheme strings each having a possibility of having a meaning syntactically are generated, and are extracted as intention estimation units.

The extracted pattern 37 shown in the intention estimation unit extraction result example 36 of FIG. 3 is an intention estimation unit which is a morpheme string having the clauses as units, the extracted pattern 38 is an intention estimation unit which consists of two clauses in each of which an indeclinable part of speech is connected with the immediately following declinable word, and the extracted pattern 39 is an intention estimation unit in which the two clauses of the extracted pattern 38 are further combined.

When the extracting process of extracting intention estimation units of step ST3 is completed, the intention estimator 6, as step ST4, carries out an intention estimation on each of the intention estimation units after extracting terms which are used for the intention estimation, and holds its score. The term sequence 41 shown in FIG. 4 shows each intention estimation and terms which are used for the intention estimation.

As terms, there can be provided (1) a method of using the morphemes as independent terms, (2) a method of using free morphemes as independent terms, (3) a method of using the single morphemes and chains of n morphemes as terms, and (4) a method of using the single morphemes and chains of attached semantic symbols which accompany each of the morphemes as terms. In this Embodiment 1, for the sake of simplicity, the explanation is put forward assuming that the basic forms of the free morphemes are extracted. Further, because various terms, such as "○○ドーム (OO doomu)", "××ランド (xx lando)", "△△ラジオ (△△ rajio)", addresses, facility genre names, and brand names, appear, it is difficult to construct an intention estimation model by only using the terms just as they are. Therefore, the symbols are standardized according to high-level concepts, and terms, such as "$facility$", "$address$", "$radio_station$", "$genre_name$", and "$brand_name$", are used.

For example, the intention estimation unit denoted by the solid line arrow 42 in the extracted pattern B of FIG. 4 shows that the following two terms "$facility$_1" and "立ち寄る (tachiyoru)" are sent as intention estimation terms for "○○ドームに立ち寄ってから (OO doomu ni tachiyottekara)", and shows that an intention of "waypoint_setting[facility=$facility$_1]" is estimated as a partial intention estimation result of the unit with a partial score of "0.95" being provided.

The solid line arrows 42, 43, and 44 of FIG. 4 show the partial intention estimation results for the intention estimation units extracted in step ST3, and the dotted line arrows 45 and 46 show the partial intention estimation results for intention estimation units which are not extracted in step ST3, and they are the partial intention estimation results regarding the intention estimation units which cover the entire voice recognition result example 33. The reason that the partial intention estimation results for the intention estimation units denoted by the dotted line arrows 45 and 46 are calculated is because there is a possibility that the input voice does not necessarily construct a grammatically correct construction. Particularly, when a voice recognition is carried out on the input voice, there is a possibility that an omission occurs in the intention estimation units when the input is expected to be syntactically strict because the user's utterance is carried out in many cases in a form in which it sufficiently uses neither particles nor auxiliary verbs. In addition, there is a possibility that recognition errors are included in the voice recognition result, and it is therefore preferable to select an intention sequence which is assumed to be best suited after evaluating all the possibilities.

When the partial intention estimation result of each of the intention estimation units is determined, the intention sequence estimator 3, as step ST5, generates intention sequences each of which matches the entire voice recognition result example 33 by using the intention estimation units, and calculates total scores. FIG. 6 shows that intention sequences each of which matches the entire voice recognition result example 33 are generated by combining the extracted patterns A, B, C, and D and the non-extracted patterns E, F, and G, which are shown in FIG. 4, and also shows the partial scores 62 of the generated intention sequences. A region O in the partial scores 62 corresponds to the partial scores of the partial intentions denoted by the solid lines in FIG. 4. Further, a region P corresponds to the partial scores of the partial intentions whose validity is low syntactically and which are denoted by the dotted lines in FIG. 4. In this Embodiment 1, in this region P, the partial score of each partial intention estimation result is multiplied by "0.9" as an intention estimation partial penalty. Further, the total score 63 is calculated by multiplying all the partial scores of the partial intentions in each of the extracted patterns.

Further, the splitting weight 64 of each extracted pattern shown in FIG. 6 is calculated on the basis of the weights used for splitting 47 shown in FIG. 4 as follows.

In the case of the intention sequence 68: 0.4×0.6× 0.4=0.096.

In the case of the extracted pattern A, because all the splitting points are used, the weights used for splitting 47 of the points are multiplied.

In the case of the intention sequence 69: (1.0−0.4)×0.6× (1.0−0.4)=0.216.

In the case of the extracted pattern B+C, because only the second splitting point is used, values acquired by subtracting the weight used for splitting 47 of each point other than the second point from 1.0, and the weight used for splitting of the second point are multiplied.

The splitting weight score 65 is calculated as "(total score 63)×(splitting weight 64)" by using the splitting weight 64 calculated as mentioned above. Referring to the calculated splitting weight score 65, as an intention understanding result of the voice recognition result example 33, "waypoint_setting[facility=$facility$_1] and radio_play [target=$radio_station$_1]" which are shown by the extracted pattern B+C are determined with the highest splitting weight score "0.197" being provided. On the other hand, similarly for the voice recognition result example 34, "waypoint_setting[facility=$facility$_1] and destination_setting[facility=$facility$_2]" which are shown by the extracted pattern B'+C' are determined as an intention understanding result with the highest splitting weight score "0.195" being provided, as shown in FIG. 7.

According to a conventional method, "waypoint_setting [facility=$facility$_1] and radio_play [target=$radio_station$_1]" which are shown by the extracted pattern B+C having a higher one of the splitting weight scores which are the intention understanding results of the above-mentioned extracted pattern B+C and the extracted pattern B'+C' are calculated as the intention estimation result to the input voice 31.

In addition, although a method of determining, as the final score, a result of multiplying the splitting weight scores 65 and 74 by the voice recognition scores 61 and 71 can also be provided as the evaluation method, because a comparison between the voice recognition score 61 and the voice recognition score 71 shows that the voice recognition score 61 of the voice recognition result example 33 has a higher value, "waypoint_setting[facility=$facility$_1] and radio_play[target=$radio_station$_1]" which are shown by the extracted pattern B+C are determined as the final intention estimation result in either case. This occurs with the voice recognition result being evaluated on a top-priority basis because no condition taking into consideration a relationship between intentions exists.

Therefore, the intention estimating device 10 in accordance with this Embodiment 1, as step ST6, defines results of performing, for example, calculations as shown below as the intention co-occurrence weights 66 and 75, and multiplies the splitting weight scores 65 and 74 by the intention co-occurrence weights respectively in order that the intention sequence estimator 3 evaluates the validity of each intention.

(1) Extract two contiguous intentions in order and calculate a relationship between the two intentions.

(a) When the two intentions have a hierarchical relationship between them, set a constant weight (e.g., 0.7).

(b) When the two intentions have a common higher ranked intention, set a weight provided for the node.

(2) Determine the multiplication by the weight determined in (1) as each of the final weights. More specifically, determine them as the final scores 67 and 76.

In the calculation according to above-mentioned (1), by providing 1.0 for a standard intention chain relation, providing a larger value than 1.0 for a closer intention chain relation, and providing a value smaller than 1.0 for an intention chain relation which is contradictory, an addition and a deduction of points are carried out.

For example, in the case of "waypoint_setting [facility=$facility$_1] and radio_play [target=$radio_station$_1]" which are shown by the extracted pattern B+C, because the common higher ranked intention is the "root" of the node 21 shown in FIG. 2, the intention co-occurrence weight provided for this node 21 is "0.5." When this process is performed on all the intention sequences, the intention co-occurrence weights 66 and 75 as shown in FIGS. 6 and 7 are provided. Each final score is calculated by using the intention co-occurrence weight calculated in this way according to the following equation.

$$(\text{final score})=(\text{splitting weight score})\times(\text{intention co-occurrence weight})\times(\text{voice recognition score})$$

Referring to the calculation results of the final scores 67 and 76, the calculation result having the highest final score is the intention sequence 77 shown by the extracted pattern B'+C', this intention sequence 77 is outputted as the intention sequence estimation result which is best suited to the user's input voice 31, as step ST7.

As mentioned above, because the intention estimating device in accordance with this Embodiment 1 is constructed in such a way as to include the intention co-occurrence weight calculator 8 that calculates an intention co-occurrence weight showing a relationship between intentions, and the intention sequence estimator 3 that calculates a splitting weight score and multiplies the calculated splitting weight score by the intention co-occurrence weight and a voice recognition score, the intention estimating device can output an intention sequence estimation result which is best suited to the input voice in consideration of the relationship between intentions. Therefore, even in a case in which an input including a plurality of intentions is made, the intention estimating device can generate a best-suited intention sequence on the basis of the relationship between intentions, and output this intention sequence as an intention sequence estimation result.

Embodiment 2

In Embodiment 2, a structure of acquiring an appropriate intention sequence estimation result even when the user omits an utterance will be shown.

Figure 9:
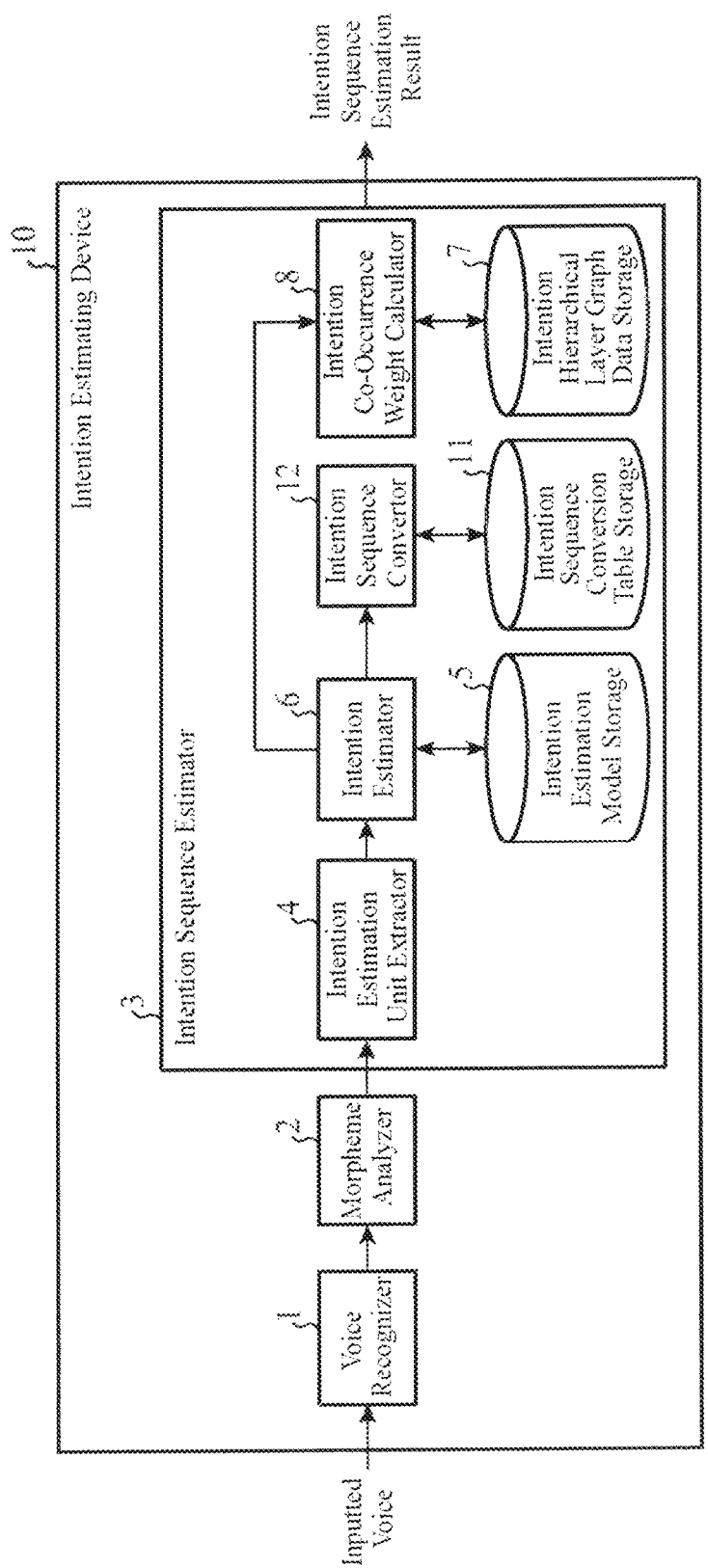
FIG. 9 is a block diagram showing the structure of an intention estimating device in accordance with Embodiment 2.

FIG. 9 is a block diagram showing the structure of an intention estimating device in accordance with Embodiment 2.

An intention sequence conversion table storage 11 and an intention sequence convertor 12 are disposed additionally in the intention estimating device 10 in accordance with Embodiment 1 shown in FIG. 1. Hereafter, the same components as those of the intention estimating device 10 in accordance with Embodiment 1 or like components are denoted by the same reference numerals as those used in Embodiment 1, and the explanation of the components will be omitted or simplified.

The intention sequence conversion table storage 11 stores, as an intention sequence conversion table, data in which a relationship between intention estimation results and replacement intention sequences are described. The intention sequence conversion table holds rules each of which indicates a replacement intention sequence by which a sequence of intentions shown by an intention estimation result is replaced, and is referred to when it is determined whether an intention sequence matching the above-mentioned rule appears and when an intention sequence for replacement is acquired.

The intention sequence convertor 12 refers to the intention sequence conversion table stored in the intention sequence conversion table storage 11 to sequentially check whether an intention sequence matching a partial intention estimation result estimated by an intention estimator 6 exists, and, when an intention sequence matching a partial intention estimation result exists, converts this intention sequence according to a rule.

FIG. 10 is a diagram showing an example of the intention sequence conversion table which the intention sequence conversion table storage 11 of the intention estimating device in accordance with Embodiment 2 stores.

The intention sequence conversion table consists of a plurality of intention sequence conversion rules. In the example of FIG. 10, three intention sequence conversion rules 81, 82, and 83 are shown. Each intention sequence conversion rule shows that when a partial intention estimation result matching an intention sequence on a left side, this partial intention estimation result is replaced by an intention sequence on a right side.

Each intention sequence conversion rule described in the position conversion table is fundamentally based on a rule of thumb at the time when an omission in the utterance and semantic conversion are clear from the content. For example, an input sentence example of the intention sequence conversion rule 81 represents its typical utterance example, and shows that an intention of "point search (facility search)" before conversion is replaced by "destination setting" because it is seen from the context that the utterance corresponding to "$facility$_Y" in a backward portion of the input sentence example indicates a destination.

Figure 11:
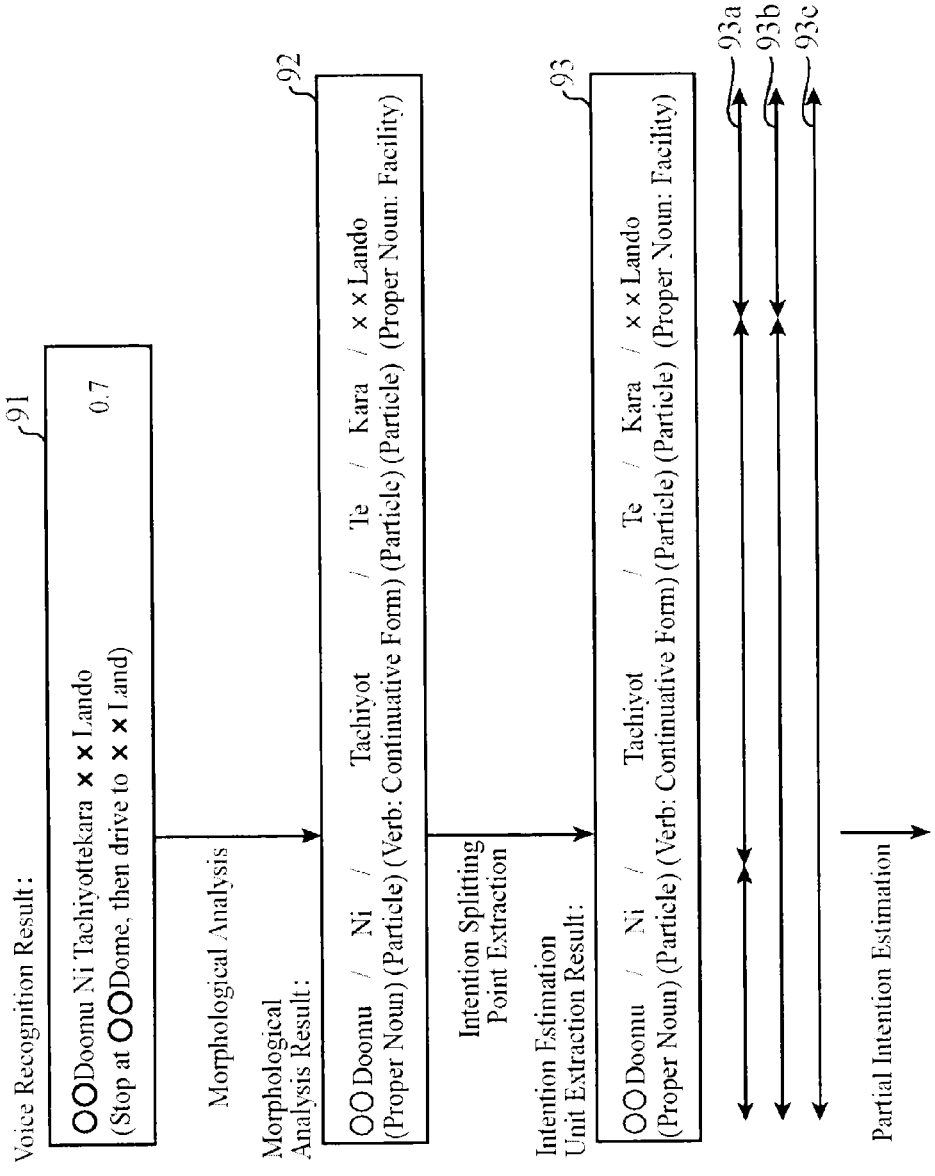
FIG. 11 is a diagram showing a concrete example of a process of extracting intention estimation units from an input voice inputted to the intention estimating device in accordance with Embodiment 2.

FIG. 11 is a diagram showing a concrete example of a process of extracting intention estimation units from an input voice which is carried out by the intention estimating device in accordance with Embodiment 2.

In FIG. 11, an example of up to extracting intention estimation units from a voice recognition result when an utterance of "○○ドームに立ち寄ってから ××ランド (OO doomu ni tachiyottekara xx lando (Stop at OO Dome then xx Land))" is inputted as the input voice is shown.

A voice recognition result 91 is a result which a voice recognizer 1 acquires by carrying out a voice recognition on the input voice 31. Concretely, a voice recognition result example in which "○○ドームに立ち寄ってから ××ランド (OO doomu ni tachiyottekara xx lando (Stop at OO Dome then xx Land))" is determined with a score of "0.7" being provided is shown, and shows that a recognition has been performed in such a way as to match the utterance. A morphological analysis result 92 is a result which a morpheme analyzer 2 acquires by carrying out a morphological analysis on the voice recognition result 91. An intention estimation unit extraction result 93 is a result which an intention estimation unit extractor 4 acquires by extracting intention estimation units from the morphological analysis result 92. Three extracted patterns 93*a*, 93*b*, and 93*c* are shown in the intention estimation unit extraction result 93.

Figure 12:
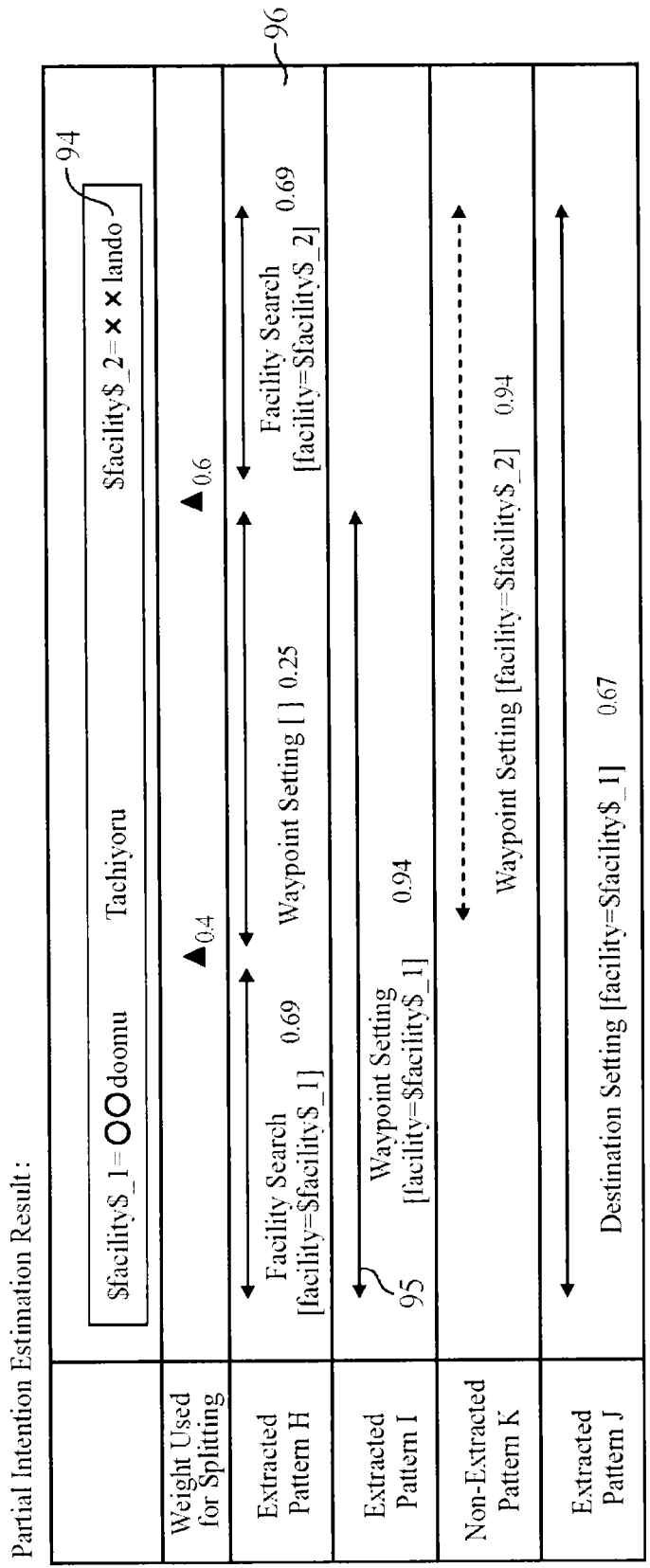
FIG. 12 is a diagram showing a process performed by an intention estimator of the intention estimating device in accordance with Embodiment 2.

FIG. 12 is a diagram showing a process carried out by the intention estimator 6 of the intention estimating device in accordance with Embodiment 2. In further detail, an estimation of partial intentions on the basis of the intention estimation unit extraction result 93 shown in FIG. 11 is shown.

A term sequence 94 shows a term sequence which is generated from the intention estimation unit extraction result 93 and which is used for an estimation of partial intentions. Further, extracted patterns H, I and J which are based on the extracted patterns 93*a*, 93*b*, and 93*c*, and a non-extracted pattern K are shown. A solid line arrow 95 and a partial score 96 are an example of a result of performing an intention estimation on each intention estimation unit. A dotted line arrow and a weight used for splitting point have the same configuration as those in accordance with Embodiment 1.

FIG. 13 is a diagram showing a process carried out by an intention sequence estimator 3 of the intention estimating device in accordance with Embodiment 2. In further detail, an example of calculation of final scores on the basis of combinations of the partial intention estimation results shown in FIG. 12 is shown.

An example of the calculation of the final scores of the combinations of the partial intention estimation results for the voice recognition result 91 is shown. A partial score 101, a voice recognition score 102, a total score 103, a splitting weight 104, a splitting weight score 105, an intention co-occurrence weight 106, and a final score 107 are shown, like in the case of Embodiment 1. An intention sequence 108 represents an intention sequence showing an intention estimation result which is best suited to all split patterns.

Figure 14:
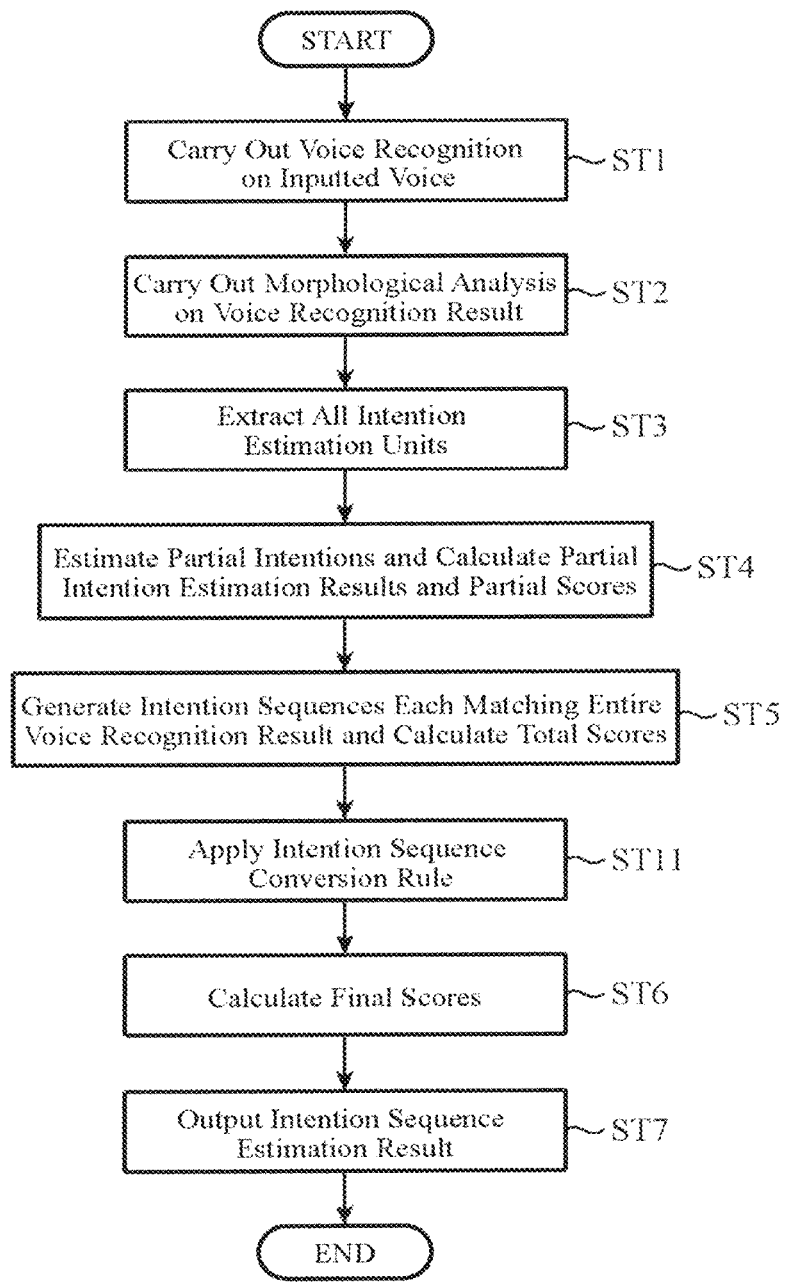
FIG. 14 is a flow chart showing the operation of the intention estimating device in accordance with Embodiment 2.

FIG. 14 is a flow chart showing the operation of the intention estimating device in accordance with Embodiment 2. Hereafter, the same steps as those of the intention estimating device 10 in accordance with Embodiment 1 are denoted by the same reference characters as those used in FIG. 8, and the explanation of the steps will be omitted or simplified.

When an intention sequence matching the entire voice recognition result and the total score is calculated in step ST5, the intention sequence convertor 12 searches through partial intention sequences of the generated intention sequence for a split pattern matching an intention sequence conversion rule stored in the intention sequence conversion table storage 11, and, when a split pattern matching an intention sequence conversion rule exists, converts the above-mentioned intention sequence on the basis of the intention sequence conversion rule (step ST11).

After that, the intention sequence estimator 3 multiplies the total score of the intention sequence converted in step ST11 or the intention sequence which is not converted in step ST11 by the intention co-occurrence weight calculated by the intention cc-occurrence weight calculator 8 and the voice recognition score to calculate the final score for the intention sequence (step ST6). In addition, the intention sequence estimator 3 refers to the final scores calculated in step ST16, and outputs an intention sequence having the highest final score as an intention sequence estimation result which is best suited to the input voice (step ST7) and ends the processing.

Next, the flow chart shown in FIG. 14 will be explained with reference to the concrete examples shown in FIGS. 11 to 13. Further, an explanation will be made by assuming that an input by voice is performed, like in the case of Embodiment 1.

First, it is assumed that "〇〇ドームに 立ち寄ってから××ランド (OO doomu ni tachiyottekara xx lando (Stop at OO Dome then xx Land))" is inputted as the input by voice, and the voice recognition result 91 shown in FIG. 11 is determined, as step ST1, with a score of "0.7" being provided. Although it is also expected that a recognition result other than the voice recognition result 91 is generated, an explanation of such a result will be omitted because it does not affect the point of the invention of Embodiment 2. When the voice recognition result 91 is generated, a morphological analysis of step ST2 and extraction of intention estimation units of step ST3 are carried out and the intention estimation unit extraction result 93 shown in FIG. 11 is acquired.

Next, the intention estimator 6, as step ST4, calculates partial intention estimation results and partial scores after extracting the term sequence 94 shown in FIG. 12. Next, the intention sequence estimator 3, as step ST5, generates intention sequences each of which matches the entire voice recognition result 91 by using the intention sequence estimation units, and calculates their total scores. As a result, the extracted patterns shown in FIG. 13, the partial scores according to these extracted patterns, and the total scores based on the partial scores are acquired.

Next, the intention sequence convertor 12, as step ST11, searches through the partial intention sequences for a replacement pattern matching an intention sequence conversion rule shown in FIG. 10, and, when a replacement pattern matching an intention sequence conversion rule exists, converts the corresponding intention sequence according to the intention sequence conversion rule.

Concretely, in the case of the intention sequence 108 shown in FIG. 13, because this intention sequence 108 consists of the partial intention sequence of an extracted pattern I and the partial intention sequence of an extracted pattern H, and matches the intention sequence conversion rule 61 shown in FIG. 10, the intention sequence is converted as follows.

Before conversion: waypoint_setting [facility=$facility$_1], facility_search [facility=$facility$_2]

After conversion: waypoint_setting [facility=$facility$_1], destination_setting [facility=$facility$_2]

Next, the intention sequence estimator 3, as step ST6, calculates the splitting weight score 105, and multiplies this splitting weight score 105 by the intention co-occurrence weight 106 calculated by the intention co-occurrence weight calculator 8 and the voice recognition score to calculate the final score 107. Finally, the intention sequence estimator 3, as step ST7, determines that "waypoint_setting [facility=$facility$_] and destination_setting [facility=$facility$_2]" of the intention sequence 108 whose final score 107 is the highest is the intention sequence estimation result which is best suited to the user's input voice, and outputs this intention sequence estimation result.

As mentioned above, because the intention estimating device in accordance with this Embodiment 2 is constructed in such a way as to include the intention sequence conversion table storage 11 that stores the intention sequence conversion table showing replacement patterns for intention sequences, and the intention sequence convertor 12 that refers to the intention conversion table stored in the intention sequence conversion table storage 11 and, when a matching intention sequence appears, replaces the intention sequence according to a replacement pattern, the intention estimating device can acquire the intention sequence estimation result which is best suited to the user's input voice even when an omission is performed in the user's utterance.

Embodiment 3

Although the explanation is made in above-mentioned Embodiment 1 by assuming that the current language is Japanese, an explanation will be made in this Embodiment 3 by assuming that the current language is English. Hereafter, an explanation will be made by taking, as an example, an intention estimating device which is applied to a navigation system.

Further, the following explanation will be made by using the intention estimating device (refer to FIG. 1) shown in Embodiment 1. It is further assumed that an intention hierarchical layer graph data storage 7 of the intention estimating device 10 stores the intention hierarchical layer graph data shown in FIG. 2. In addition, the explanation will be made by assuming that an intention estimating process is carried out according to the flow chart shown in FIG. 8.

FIG. 15 is a diagram showing a concrete example of a process of extracting intention estimation units from an input voice which is carried out by the intention estimating device in accordance with Embodiment 3.

The input voice 111 shows that a user utters, as an input example, "Stop at OO Dome, then drive to xx Land." A voice recognition result 112 is a result which a voice recognizer 1 acquires by carrying out a voice recognition on the input voice 111. Concretely, the voice recognition result consists of a voice recognition result example 113 of "Stop at OO Dome, then listen to the ΔΔ Radio" which is determined with a voice recognition score of "0.6" being provided, and a voice recognition result example 114 of "Stop at OO Dome, then drive to xx Land" which is determined with a voice recognition score of "0.4" being provided.

A morphological analysis result 115 is a result which a morpheme analyzer 2 acquires by carrying out a morphological analysis on the voice recognition result 112. Intention estimation unit extraction results 116 and 120 are results which an intention estimation unit extractor 4 acquires by extracting intention estimation units from the morphological analysis result 115 on the basis of syntactic constraints on the language. In the intention estimation unit extraction result 116, three extracted patterns 117, 118, and 119 are shown. As shown in FIG. 15, when the language is English, words, such as nouns, verbs, and adjectives, are extracted as intention estimation units. The intention estimation result extraction units shown in the extracted patterns 117, 118, and 119 are results of extracting only patterns for which a dependency structure 16 explained above is established.

After that, an intention estimator 6 refers to each extracted pattern of the intention estimation unit extraction results 116 and 120 to estimate a partial intention of each extracted pattern by using an intention estimation model and calculate a partial score. Concrete processed results acquired by the intention estimator 6 are shown in FIGS. 16 and 17.

FIGS. 16 and 17 are diagrams showing the process carried out by the intention estimator 6 of the intention estimating device in accordance with Embodiment 3. In further detail, FIG. 16 shows an estimation of partial intentions on the basis of the intention estimation unit extraction result 116 shown in FIG. 15, and FIG. 17 shows an estimation of partial intentions on the basis of the intention estimation unit extraction result 120 shown in FIG. 15.

A case of extracting the basic forms of words as terms will be explained with reference to FIGS. 16 and 17. First, the estimating process of estimating partial intentions will be explained with reference to FIG. 16.

A term sequence 121 shows a term sequence which is generated from the intention estimation unit extraction result 116 and which is used for an estimation of partial intentions, and shows that "$facility$_1" is generated for "OO Dome", "stop" is generated for "Stop at", "$radio_station$_1" is generated for "the ΔΔ Radio", and "listen" is generated for "listen to."

In addition, in FIG. 16, weights used for splitting and a plurality of extracted patterns are shown for the term sequence 121. In the example of FIG. 16, as the extracted patterns, extracted patterns a, b, c, and d and non-extracted patterns e, f, and g which are based on the extracted patterns 117, 118, and 119 shown in FIG. 15 are shown. Each of solid line arrows 122, 123, and 124 shows the range of an intention estimation unit extracted by the intention estimation unit extractor 4. Further, below each of the above-mentioned solid line arrows 122, 123, and 124, a partial intention which is a result estimated by the intention estimator 6, and the partial score of this estimated partial intention are shown. Further, each of dotted line arrows 125 and 126 shows the range in which nothing is extracted by the intention estimation unit extractor 4. Below each of the above-mentioned dotted line arrows 125 and 126, a partial intention which is a result estimated by the intention estimator 6, and the partial score of this estimated partial intention are described. In addition, each of the weights used for splitting point 127 described below the term sequence 121 is a numerical value by which the score is multiplied when each specified position is used as a point for splitting into intention estimation units. In contrast, when each specified position is not used as a point for splitting into intention estimation units, a value which is acquired by subtracting the above-mentioned weight used for splitting point 127 from 1 is a numerical value by which the score is multiplied.

Next, the estimating process of estimating partial intentions will be explained with reference to FIG. 17.

A term sequence 131 shows a term sequence which is generated from the intention estimation unit extraction result 120 and which is used for an estimation of partial intentions, and shows that "$facility$_1" is generated for "OO Dome", "Stop" is generated for "Stop at", "$facility$_2" is generated for "xx Land", and "drive" is generated for "drive to."

In addition, in FIG. 17, weights used for splitting and a plurality of extracted patterns are shown for the term sequence 131. In the example of FIG. 17, as the extracted patterns, extracted patterns a', b', c', and d' and non-extracted patterns e', f', and g' which are based on the extracted patterns shown in FIG. 15 are shown. Each of solid line arrows 132, 133, and 134 shows the range of an intention estimation unit extracted by the intention estimation unit extractor 4. Further, below each of the above-mentioned solid line arrows 132, 133, and 134, a partial intention which is a result estimated by the intention estimator 6, and the partial score of this estimated partial intention are shown. Further, each of dotted line arrows 135 and 136 shows the range in which nothing is extracted by the intention estimation unit extractor 4. Below each of the above-mentioned dotted line arrows 135 and 136, a partial intention which is a result estimated by the intention estimator 6, and the partial score of this estimated partial intention are described. In addition, each of the weights used for splitting point 137 described below the term sequence 131 is a numerical value by which the score is multiplied when each specified position is used as a point for splitting into intention estimation units. In contrast, when each specified position is not used as a point for splitting into intention estimation units, a value which is acquired by subtracting the above-mentioned weight used for splitting point 137 from 1 is a numerical value by which the score is multiplied.

Next, the intention sequence estimator 3 generates combinations of the partial intention estimation results for the voice recognition result examples 113 and 114 by using the partial intention estimation results estimated by the intention estimator 6, and calculates a final score of each of the combinations. Concrete processed results acquired by the intention sequence estimator 3 are shown in FIGS. 18 and 19.

FIGS. 18 and 19 are diagrams showing the process carried out by the intention sequence estimator 3 of the intention estimating device in accordance with Embodiment 3. In further detail, FIG. 18 shows an example of the calculation of final scores on the basis of combinations of the partial intention estimation results shown in FIG. 16, and FIG. 19 shows an example of the calculation of final scores on the basis of combinations of the partial intention estimation results shown in FIG. 17.

Each final score is calculated by multiplying the partial scores for the sequence of all contiguous partial intentions in each intention estimation unit by each other, and further multiplying the multiplication result by the validity of intention estimation units and an intention co-occurrence weight calculated by an intention co-occurrence weight calculator 8.

FIG. 18 shows an example of the calculation of final scores for the voice recognition result example 113, and the voice recognition score 141 of the voice recognition result example 113 is shown to be "0.6." Further, each partial score 142 shows the partial score of a partial intention estimation result in each extracted pattern at the time of using the term sequence 121. Each total score 143 shows the product of the partial scores of partial intention estimation results. Each splitting weight 144 shows a result of the calculation of a weight according to whether or not to use splitting points. The value of each splitting weight 144 is a numerical value showing the possibility of splitting into intentions, and the sum total of the values of the splitting weights 144 is "1.0." Each splitting weight score (a score showing the likelihood of an intention sequence) 145 is the product of the total score 143 and the splitting weight 144.

Each intention co-occurrence weight 146 is a numerical value which is determined from the intention hierarchical layer graph shown in FIG. 2, and a partial intention sequence. Each final score 147 is a value which is the result of multiplication of the splitting weight score 145, the voice recognition score 141, and the intention co-occurrence weight 146. An intention sequence 68 of the extracted pattern a is the one in which the final score is described in the case of splitting the voice recognition result example 113 into all the clauses as the intention sequence pattern of the voice recognition result example 113. Further, an intention sequence 149 of an extracted pattern b+c is the one in which the final score is described in the case of defining each sentence having a compound structure as a single section.

FIG. 19 shows an example of the calculation of final scores for the voice recognition result example 114, and the voice recognition score 151 of the voice recognition result example 114 is shown to be "0.4." Further, a term sequence 131, total scores 152, splitting weights 153, splitting weight scores 154, intention co-occurrence weights 155, and final scores 156 are the same as those in the structure explained in FIG. 18. Further, an intention sequence 157 of an extracted pattern b'+c' is the one in which the final score is described in the case of defining each sentence having a compound structure as a single section.

Next, the operation of the intention estimating device in accordance with Embodiment 3 will be explained. A flow chart showing the operation of the intention estimating device in accordance with Embodiment 3 is the same as the flow chart of Embodiment 1 shown in FIG. 8. Next, the flow chart of Embodiment 1 shown in FIG. 8 will be explained with reference to the concrete examples shown in FIGS. 2, and 15 to 19. Hereafter, an explanation will be made by assuming that an input by voice is performed.

First, it is assumed that the input voice 111, shown in FIG. 15, of "Stop at OO Dome, then drive to xx Land" is inputted as the input by voice, the voice recognizer 1, as step ST1, carries out a voice recognition on the above-mentioned input voice 111, and the voice recognition result 112 is acquired. It is assumed that as the voice recognition result 112, the voice recognition result example 113 of "Stop at OO Dome, then listen to the ΔΔ Radio" is determined with a score of "0.6" being provided, and the voice recognition result example 114 of "Stop at OO Dome, then drive to xx Land" is determined with a score of "0.4" being provided. These voice recognition result examples 113 and 114 are outputted to the morpheme analyzer 2.

The morpheme analyzer 2, as step ST2, carries out a morphological analysis on the voice recognition result examples 113 and 114 on the basis of a known morphological analysis method to generate morphological analysis results 115 shown in FIG. 3. Although surface morphemes, parts of speech, and conjugated forms are described in the morphological analysis results 115 in the example of FIG. 15, besides these pieces of information, information including the detailed classifications of the parts of speech, the basic forms of the morphemes, and the semantic labels of the morphemes can be outputted, and it is assumed that at least the basic forms of the morphemes are included.

The morphological analysis results 115 consist of two morphological analysis result examples 116 and 120, and each of these morphological analysis result examples is outputted to the intention estimation unit extractor 4.

The intention estimation unit extractor 4, as step ST3, extracts all the intention estimation units of each of the morphological analysis result examples 116 and 120 on the basis of the syntactic characteristics of the language. For example, in the case of the morphological analysis result example 116 in English, first, the following four clauses: "stop (v)/at (prep)", "OO Dome (n:POI)", "then (adv)/drive (v)/to (prep)", and "the (art)/ΔΔ Radio (n:radio station)" are extracted as intention estimation units.

Next, on the basis of the characteristic of an indeclinable part of speech having a dependency relation with a declinable word, as a syntactic constraint, a group of clauses between which a dependency relation is established is extracted as one intention estimation unit. In addition, because there is a characteristic of the attributive form of a declinable word having a dependency relation with the following indeclinable part of speech and the continuative form of a declinable word having a dependency relation with the following declinable word, an extension of intention estimation units is carried out on the basis of this characteristic. By repeating this process, morpheme strings each having a possibility of having a meaning syntactically are generated, and are extracted as intention estimation units.

The extracted pattern 117 shown in the intention estimation unit extraction result example 116 of FIG. 15 is an intention estimation unit which is a morpheme string having the clauses as units, the extracted pattern 118 is an intention estimation unit which consists of two clauses in each of which a noun is connected with the immediately preceding verb, and the extracted pattern 119 is an intention estimation unit in which the two clauses of the extracted pattern 118 are further combined.

When the extracting process of extracting intention estimation units of step ST3 is completed, the intention estimator 6, as step ST4, carries out an intention estimation on each of the intention estimation units after extracting terms which are used for the intention estimation, and holds its score. The term sequence 121 shown in FIG. 16 shows each intention estimation and terms which are used for the intention estimation.

As terms, there can be provided (1) a method of using the morphemes as independent terms, (2) a method of using limited words, such as nouns, verbs, and adjectives, as independent terms, (3) a method of using the single morphemes and chains of n morphemes as terms, and (4) a method of using the single morphemes and chains of attached semantic symbols which accompany each of the morphemes as terms. In this Embodiment 3, for the sake of simplicity, the explanation is put forward assuming that the basic forms of the limited words, such as nouns, verbs, and adjectives, are extracted. However, it is assumed that in the case of nouns, such as facilities and addresses, a string of plural words is a single section. Further, because various terms, such as "OO Dome", "xx Land", "ΔΔ Radio", addresses, facility genre names, and brand names, appear, it is difficult to construct an intention estimation model by only using the terms just as they are. Therefore, the symbols are standardized according to high-level concepts, and terms, such as "$facility$", "$address$", "$radio_station$", "$genre_name$", and "$brand_name$", are used.

For example, the intention estimation unit denoted by the solid line arrow 122 in the extracted pattern b of FIG. 16 shows that the following two terms "stop" and "$facility$_1" are sent as intention estimation terms for "stop at OO Dome", and shows that an intention of "waypoint_setting[facility=$facility$_1]" is estimated as a partial intention estimation result of the unit with a partial score of "0.95" being provided.

The solid line arrows 122, 123, and 124 of FIG. 16 show the partial intention estimation results for the intention estimation units extracted in step ST3, and the dotted line arrows 125 and 126 show the partial intention estimation results for intention estimation units which are not extracted in step ST3, and they are the partial intention estimation results regarding the intention estimation units which cover the entire voice recognition result example 113. The reason that the partial intention estimation results for the intention estimation units denoted by the dotted line arrows 125 and 126 are calculated is because there is a possibility that the input voice does not necessarily construct a grammatically correct construction. Particularly, when a voice recognition is carried out on the input voice, there is a possibility that an omission occurs in the intention estimation units when the input is expected to be syntactically strict because the user's utterance is carried out in many cases in a form in which it sufficiently uses neither articles nor prepositions. In addition, there is a possibility that recognition errors are included in the voice recognition result, and it is therefore preferable to select an intention sequence which is assumed to be best suited after evaluating all the possibilities.

When the partial intention estimation result of each of the intention estimation units is determined, the intention sequence estimator 3, as step ST5, generates intention sequences each of which matches each of the entire voice recognition result examples 113 and 114 by using the intention estimation units, and calculates total scores. FIG. 18 shows that intention sequences each of which matches the entire voice recognition result example 113 are generated by combining the extracted patterns a, b, c, and d and the non-extracted patterns e, f, and g, which are shown in FIG. 16, and also shows the partial scores 142 of the generated intention sequences. A region O in the partial scores 142 corresponds to the partial scores of the partial intentions denoted by the solid lines in FIG. 16. Further, a region P corresponds to the partial scores of the partial intentions whose validity is low syntactically and which are denoted by the dotted lines in FIG. 16. In this Embodiment 1, in this region P, the partial score of each partial intention estimation result is multiplied by "0.9" as an intention estimation partial penalty. Further, the total score 143 is calculated by multiplying all the partial scores of the partial intentions in each of the extracted patterns.

Further, the splitting weight 144 of each extracted pattern shown in FIG. 18 is calculated on the basis of the weights used for splitting 127 shown in FIG. 16 as follows.

In the case of the intention sequence 148: 0.4×0.6×0.4=0.096.

In the case of the extracted pattern a, because all the splitting points are used, the weights used for splitting 127 of the points are multiplied.

In the case of the intention sequence 149: (1.0−0.4)×0.6×(1.0−0.4)=0.216.

In the case of the extracted pattern b+c, because only the second splitting point is used, values acquired by subtracting the weight used for splitting 127 of each point other than the second point from 1.0, and the weight used for splitting of the second point are multiplied.

The splitting weight score 145 is calculated as "(total score 143)×(splitting weight 144)" by using the splitting weight 144 calculated as mentioned above. Referring to the calculated splitting weight score 145, as an intention understanding result of the voice recognition result example 113, "waypoint_setting[facility=$facility$_1] and radio_play[target=$radio_station$_1]" which are shown by the extracted pattern b+c are determined with the highest splitting weight score "0.197" being provided. On the other hand, similarly for the voice recognition result example 114, "waypoint_setting[facility=$facility$_1] and destination_setting[facility=$facility$_2]" which are shown by the extracted pattern b'+c' are determined as an intention understanding result with the highest splitting weight score "0.195" being provided, as shown in FIG. 19.

According to a conventional method, "waypoint_setting[facility=$facility$_1] and radio_play[target=$radio_station$_1]" which are shown by the extracted pattern b+c having a higher one of the splitting weight scores which are the intention understanding results of the extracted pattern b+c and the extracted pattern b'+c' are calculated as the intention estimation result to the input voice 111.

In addition, although a method of determining, as the final score, a result of multiplying the splitting weight scores 145 and 154 by the voice recognition scores 141 and 151 can also be provided as the evaluation method, because a comparison between the voice recognition score 141 and the voice recognition score 151 shows that the voice recognition score 141 of the voice recognition result example 113 has a higher value, "waypoint_setting[facility=$facility$_1] and radio_play[target=$radio_station$_1]" which are shown by the extracted pattern b+c are determined as the final intention estimation result in either case. This occurs with the voice recognition result being evaluated on a top-priority basis because no condition taking into consideration a relationship between intentions exists.

Therefore, the intention estimating device 10 in accordance with this Embodiment 3, as step ST6, defines results of performing, for example, calculations as shown below as the intention co-occurrence weights 146 and 155, and multiplies the splitting weight scores 145 and 154 by the intention co-occurrence weights respectively in order that the intention sequence estimator 3 evaluates the validity of each intention.

(1) Extract two contiguous intentions in order and calculate a relationship between the two intentions.

(a) When the two intentions have a hierarchical relationship between them, set a constant weight (e.g., 0.7).

(b) When the two intentions have a common higher ranked intention, set a weight provided for the node.

(2) Determine the product of the weights determined in (1) as each of the final weights. More specifically, determine them as the final scores 147 and 156.

In the calculation according to above-mentioned (1), by providing 1.0 for a standard intention chain relation, providing a larger value than 1.0 for a closer intention chain relation, and providing a value smaller than 1.0 for an intention chain relation which is contradictory, an addition and a deduction of points are carried out.

For example, in the case of "waypoint_setting[facility=$facility$_1] and radio_play[target=$radio_station$_1]" which are shown by the extracted pattern b+c, because the common higher ranked intention is the "root" of the node 21 shown in FIG. 2, the intention co-occurrence weight provided for this node 21 is "0.5." When this process is calculated for all the intention sequences, the intention co-occurrence weights 146 and 155 as shown in FIGS. 18 and 19 are provided. Each final score is calculated by using the intention co-occurrence weight calculated in this way according to the following equation.

$$\text{(final score)}=\text{(splitting weight score)}\times\text{(intention co-occurrence weight)}\times\text{(voice recognition score)}$$

Referring to the calculation results of the final scores 147 and 156, the calculation result having the highest final score is the intention sequence 157 shown by the extracted pattern b'+c', this intention sequence 157 is outputted as the intention sequence estimation result which is best suited to the user's input voice 111, as step ST7.

As mentioned above, because the intention estimating device in accordance with this Embodiment 3 is constructed in such a way as to include the intention co-occurrence weight calculator 8 that calculates an intention co-occurrence weight showing a relationship between intentions, and the intention sequence estimator 3 that calculates a splitting weight score and multiplies the calculated splitting weight score by the intention co-occurrence weight and a voice recognition score, the intention estimating device can output an intention sequence estimation result which is best suited to the input voice in consideration of the relationship between intentions. Therefore, even in a case in which an input including a plurality of intentions is made, the intention estimating device can generate a best-suited intention sequence on the basis of the relationship between intentions, and output this intention sequence as an intention sequence estimation result.

Embodiment 4

Although the explanation is made in above-mentioned Embodiment 2 by assuming that the current language is Japanese, an explanation will be made in this Embodiment 4 by assuming that the current language is English. Hereafter, an explanation will be made by taking, as an example, an intention estimating device which is applied to a navigation system.

Further, the following explanation will be made by using the intention estimating device (refer to FIG. 9) shown in Embodiment 2. It is further assumed that an intention sequence conversion table storage 11 of the intention estimating device 10 stores the intention sequence conversion table shown in FIG. 10. In addition, the explanation will be made by assuming that an intention estimating process is carried out according to the flow chart shown in FIG. 14.

Figure 20:
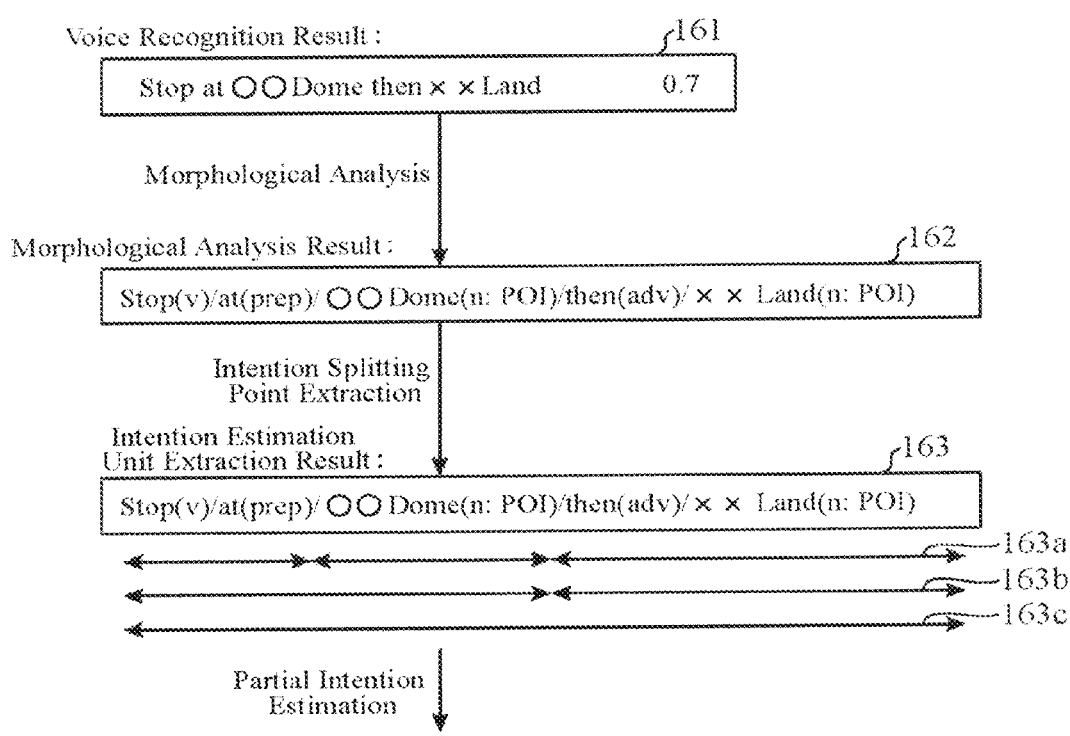
FIG. 20 is a diagram showing a concrete example of a process of extracting intention estimation units from an input voice inputted to an intention estimating device in accordance with Embodiment 4.

FIG. 20 is a diagram showing a concrete example of a process of extracting intention estimation units from an input voice which is carried out by the intention estimating device in accordance with Embodiment 4.

In FIG. 20, an example of up to extracting intention estimation units from a voice recognition result when an utterance of "Stop at OO Dome then xx Land" is inputted as the input voice is shown.

A voice recognition result 161 is a result which a voice recognizer 1 acquires by carrying out a voice recognition on the input voice 31. Concretely, a voice recognition result example in which "Stop at OO Dome then xx Land" is determined with a score of "0.7" being provided is shown, and shows that a recognition has been performed in such a way as to match the utterance. A morphological analysis result 162 is a result which a morpheme analyzer 2 acquires by carrying out a morphological analysis on the voice recognition result 161. An intention estimation unit extraction result 163 is a result which an intention estimation unit extractor 4 acquires by extracting intention estimation units from the morphological analysis result 162. Three extracted patterns 163a, 163b, and 163c are shown in the intention estimation unit extraction result 163.

Figure 21:
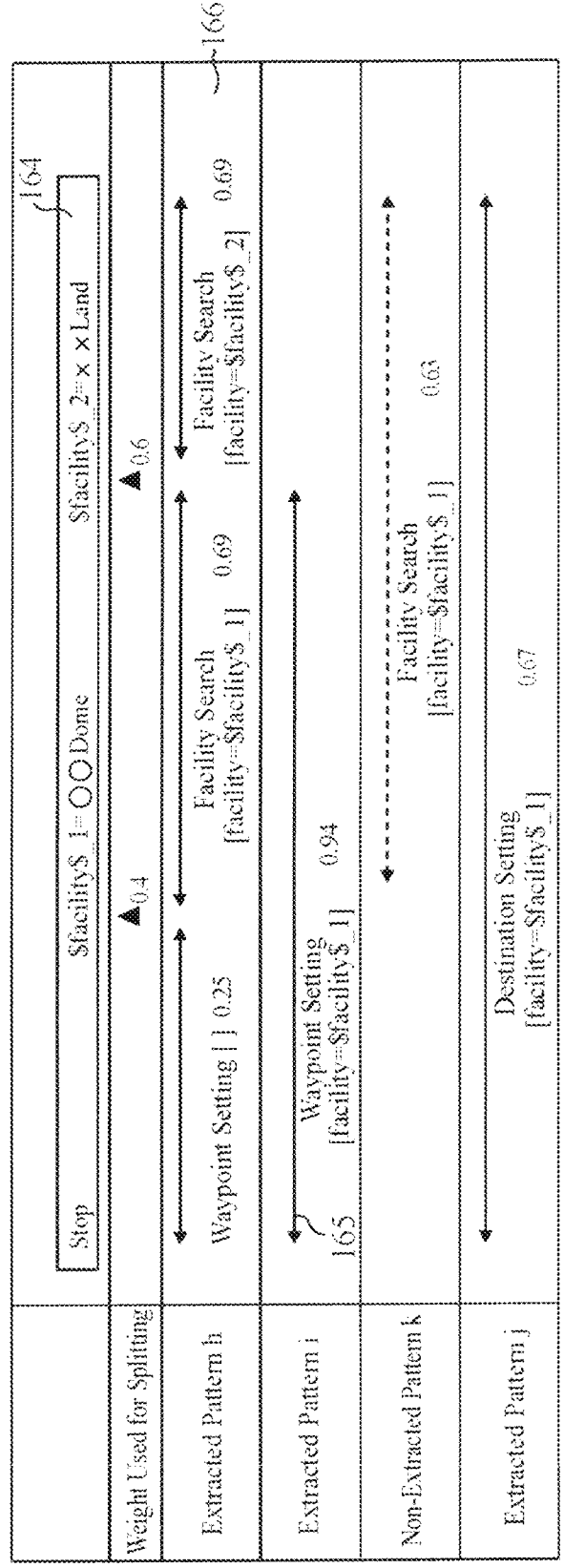
FIG. 21 is a diagram showing a process performed by an intention estimator of the intention estimating device in accordance with Embodiment 4.

FIG. 21 is a diagram showing a process carried out by the intention estimator 6 of the intention estimating device in accordance with Embodiment 4. In further detail, an estimation of partial intentions on the basis of the intention estimation unit extraction result 163 shown in FIG. 20 is shown.

A term sequence 164 shows a term sequence which is generated from the intention estimation unit extraction result 163 and which is used for an estimation of partial intentions. Further, extracted patterns h, i and j which are based on the extracted patterns 163a, 163b, and 163c, and a non-extracted pattern k are shown. A solid line arrow 165 and a partial score 166 are an example of a result of performing an intention estimation on each intention estimation unit. A dotted line arrow and a weight used for splitting point have the same configuration as that in accordance with Embodiment 1.

FIG. 22 is a diagram showing a process carried out by an intention sequence estimator 3 of the intention estimating device in accordance with Embodiment 4. In further detail, an example of calculation of final scores on the basis of combinations of the partial intention estimation results shown in FIG. 12 is shown.

An example of the calculation of the final scores of the combinations of the partial intention estimation results for the voice recognition result 161 is shown. A partial score 171, a voice recognition score 172, a total score 173, a splitting weight 174, a splitting weight score 175, an intention co-occurrence weight 176, and a final score 177 are shown, like in the case of Embodiment 3. An intention sequence 178 represents an intention sequence showing an intention estimation result which is best suited to all split patterns.

Next, the operation of the intention estimating device in accordance with Embodiment 4 will be explained. A flow chart showing the operation of the intention estimating device in accordance with Embodiment 4 is the same as the flow chart of Embodiment 2 shown in FIG. 14. Next, the flow chart of Embodiment 2 shown in FIG. 14 will be explained with reference to the concrete examples shown in FIGS. 2, 10, and 20 to 22. Hereafter, an explanation will be made by assuming that an input by voice is performed.

First, it is assumed that "Stop at OO Dome then xx Land" is inputted as the input by voice, the voice recognizer 1, as step ST1, carries out a voice recognition on the input voice, and the voice recognition result 161 shown in FIG. 20 is acquired with a score of "0.7" being provided. Although it is also expected that a recognition result other than the voice recognition result 161 is generated, an explanation of such a result will be omitted because it does not affect the point of the invention of Embodiment 4. When the voice recognition result 161 is generated, a morphological analysis of step ST2 and extraction of intention estimation units of step ST3 are carried out and the intention estimation unit extraction result 163 shown in FIG. 20 is acquired.

Next, the intention estimator 6, as step ST4, calculates partial intention estimation results and partial scores after extracting the term sequence 164 shown in FIG. 21. Next, the intention sequence estimator 3, as step ST5, generates intention sequences each of which matches the entire voice recognition result 161 by using the intention sequence estimation units, and calculates their total scores. As a result, the extracted patterns shown in FIG. 22, the partial scores according to these extracted patterns, and the total scores based on the partial scores are acquired.

Next, an intention sequence convertor 12, as step ST11, searches through the partial intention sequences for a replacement pattern matching an intention sequence conversion rule shown in FIG. 10, and, when a replacement pattern matching an intention sequence conversion rule exists, converts the corresponding intention sequence according to the intention sequence conversion rule.

Concretely, in the case of the intention sequence 178 shown in FIG. 22, because this intention sequence 178 consists of the partial intention sequence of an extracted pattern i and the partial intention sequence of an extracted pattern h, and matches the intention sequence conversion rule 81 shown in FIG. 10, the intention sequence is converted as follows.

Before conversion: waypoint_setting [facility=$facility$_1], facility_search [facility=$facility$_2]

After conversion: waypoint_setting [facility=$facility$_1], destination_setting [facility=$facility$_2]

Next, the intention sequence estimator 3, as step ST6, calculates the splitting weight score 175, and multiplies this splitting weight score 175 by the intention co-occurrence weight 176 calculated by an intention co-occurrence weight calculator 8 and the voice recognition score to calculate the final score 177. Finally, the intention sequence estimator 3, as step ST7, determines that "waypoint_setting [facility=$facility$_1] and destination_setting [facility=$facility$_2]" of the intention sequence 178 whose final score 177 is the highest is the intention sequence estimation result which is best suited to the user's input voice, and outputs this intention sequence estimation result.

As mentioned above, because the intention estimating device in accordance with this Embodiment 4 is constructed in such a way as to include the intention sequence conversion table storage 11 that stores the intention sequence conversion table showing replacement patterns for intention sequences, and the intention sequence convertor 12 that refers to the intention conversion table stored in the intention sequence conversion table storage 11 and, when a matching intention sequence appears, replaces the intention sequence according to a replacement pattern, the intention estimating device can acquire the intention sequence estimation result which is best suited to the user's input voice even when an omission is performed in the user's utterance.

Although the structure of acquiring an intention sequence estimation result is shown in above-mentioned Embodiments 1 to 4 by taking, as an example, Japanese and English, any of the embodiments can be applied to various languages, such as German and Chinese, by changing the extraction method regarding intention extraction units according to language.

Further, the intention estimating device in accordance with any one of above-mentioned Embodiments 1 to 4 is constructed in such a way as to perform an intention estimating process directly after performing an extracting process of extracting $facility$, $address$, etc. on an input natural language text by using a method such as a pattern matching method in a case in which the language is the one in which each word is separated by specific symbols (spaces or the like) and it is difficult to analyze the linguistic structure.

Further, although the explanation is made in above-mentioned Embodiments 1 to 4 by taking, as an example, the case in which the input is a voice input, the same advantages can be expected even in a case in which the user is allowed to make a text input by using an input unit, such as a keyboard, instead of using a voice recognition as an input unit.

Further, although the example of determining two higher ranked candidates having a higher splitting weight score as targets for the evaluation process is shown in above-mentioned Embodiments 1 to 4, the number of targets for the evaluation process is not limited. Further, in a case in which the voice recognition result is outputted not only in the form of a text but also in units of a morpheme, the unit that carries out a morphological analysis can be eliminated, and the intention estimating device can be constructed in such a way as to extract and process intention estimation terms just from morphemes.

Further, although the example of assuming a learning model according to a maximum entropy method as the intention estimation method is explained in above-mentioned Embodiments 1 to 4, the intention estimation method is not limited.

Further, although the explanation is made by using, as a combination which is a target for estimation of each partial intention, a combination of only first-ranked intentions in above-mentioned Embodiments 1 to 4, it is also possible to calculate an intention sequence estimation result by generating a candidate for each of all candidates having a certain fixed score or higher.

Further, although the explanation is made in above-mentioned Embodiments 1 to 4 by taking, as an example, the case in which the intention estimating device is applied to a navigation system, the intention estimating device can be applied to any of various types of systems as long as they perform an intention estimation.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

As mentioned above, the intention estimating device and the intention estimating method in accordance with the present invention can be applied to a navigation device equipped a the voice recognition function, and so on, and can generate a best-suited intention sequence on the basis of a relationship among a plurality of intentions even when an input including the plurality of intentions is made.

EXPLANATIONS OF REFERENCE NUMERALS

1 voice recognizer, 2 morpheme analyzer, 3 intention sequence estimator, 4 intention estimation unit extractor, 5 intention estimation model storage, 6 intention estimator, 7 intention hierarchical layer graph data storage, 8 intention co-occurrence weight calculator, 10 intention estimating device, 11 intention sequence conversion table storage, 12 intention sequence convertor.

The invention claimed is:

1. An intention estimating device that estimates a user's intention from the user's language input, said intention estimating device comprising:
   an intention estimation unit extractor that splits the inputted language into a plurality of morphemes and extracts, from the morphemes, one or more intention estimation units each of which is a unit on which an estimation of said intention is to be performed, each of the intention estimation units consisting of one or more morphemes;
   an intention estimator that estimates a respective partial intention which indicates a respective intention for each of the intention estimation units extracted by said intention estimation unit extractor;
   an intention co-occurrence weight calculator that calculates an intention co-occurrence weight having a value which depends on a relationship between said partial intentions estimated by said intention estimator; and an intention sequence estimator that:
   generates an intention sequence corresponding to said inputted language by using one or more said partial intentions estimated by said intention estimator, and
   generates an intention estimation result corresponding to said inputted language by using both a score showing a likelihood of said generated intention sequence and the intention co-occurrence weight calculated for said partial intentions which construct said generated intention sequence.

2. The intention estimating device according to claim 1, wherein said intention co-occurrence weight calculator refers to intention hierarchical layer graph data in which said intentions are hierarchized and defined according to the relationship between said intentions to calculate said intention co-occurrence weight by using a weight which is defined for each of said intentions which constructs each hierarchical layer.

3. The intention estimating device according to claim 2, wherein said intention hierarchical layer graph data have a relationship in which an intention in a lower hierarchical layer gives a concrete form to an intention in a higher hierarchical layer, and said intention co-occurrence weight calculator refers to said intention hierarchical layer graph data to, when a common intention in a higher hierarchical layer exists in two contiguous partial intentions which construct said intention sequence generated by said intention sequence estimator, calculate said intention co-occurrence weight by using a weight defined for said intention in a higher hierarchical layer.

4. The intention estimating device according to claim 2, wherein said intention hierarchical layer graph data have a relationship in which an intention in a lower hierarchical layer gives a concrete form to an intention in a higher hierarchical layer, and said intention co-occurrence weight calculator refers to said intention hierarchical layer graph data to, when a hierarchical relationship exists between two continuous partial intentions which construct said intention sequence generated by said intention sequence estimator, set a preset value as said intention co-occurrence weight, the hierarchical relationship indicating that one or more graph paths exist along a direction from one partial intention in the higher hierarchical layer to another partial intention in the lower hierarchical layer represented by the intention hierarchical layer graph data.

5. The intention estimating device according to claim 1, wherein said intention estimating device includes an intention sequence conversion table that holds an intention sequence conversion rule for converting said partial intentions according to a relationship between a contiguous sequence of said partial intentions which construct said intention sequence, and an intention sequence convertor that converts said partial intention having a relationship matching the intention sequence conversion rule described in said intention sequence conversion table, among the contiguous sequence of said partial intentions which construct said intention sequence generated by said intention sequence estimator, according to said intention sequence conversion rule.

6. An intention estimating method of estimating a user's intention from the user's language input, said method comprising:
   slitting the inputted language into a plurality of morphemes and extracting, from the morphemes, one or more intention estimation units each of which is a unit on which an estimation of said intention is to be performed, each of the intention estimation units consisting of one or more morphemes;
   estimating a respective partial intention which indicates a respective intention for each of said extracted intention estimation units;
   calculating an intention co-occurrence weight having a value which depends on a relationship between said estimated partial intentions; and
   generating an intention sequence corresponding to said inputted language by using said estimated one or more said partial intentions, and generating an intention estimation result corresponding to said inputted language by using both a score showing a likelihood of said generated intention sequence and the intention co-occurrence weight calculated for said partial intentions which construct said generated intention sequence.

7. The intention estimating method according to claim 6, wherein, the calculating the intention co-occurrence weight includes referring to intention hierarchical layer graph data in which said intentions are hierarchized and defined according to the relationship between said intentions to calculate said intention co-occurrence weight by using a weight which is defined for each of said intentions which constructs each hierarchical layer.

8. The intention estimating method according to claim 7, wherein said intention hierarchical layer graph data have a relationship in which an intention in a lower hierarchical layer gives a concrete form to an intention in a higher hierarchical layer, and the calculating the intention co-occurrence weight includes referring to said intention hierarchical layer graph data to, when a common intention in a higher hierarchical layer exists in two continuous partial intentions which construct said generated intention sequence, calculate said intention co-occurrence weight by using a weight defined for said intention in a higher hierarchical layer.

9. The intention estimating method according to claim 7, wherein said intention hierarchical layer graph data have a relationship in which an intention in a lower hierarchical layer gives a concrete form to an intention in a higher hierarchical layer, and the calculating the intention co-occurrence weight includes referring to said intention hierarchical layer graph data to, when a hierarchical relationship exists between two continuous partial intentions which construct said generated intention sequence, set a preset value as said intention co-occurrence weight, the hierarchical relationship indicating that one or more graph paths exist along a direction from one partial intention of the higher hierarchical layer to another partial intention of the lower hierarchical layer in the intention hierarchical layer graph data.

10. The intention estimating method according to claim 6, further comprising:
   an intention sequence conversion table that holds an intention sequence conversion rule for converting said partial intentions according to a relationship between a contiguous sequence of said partial intentions which construct said intention sequence; and
   converting said partial intention having a relationship matching the intention sequence conversion rule described in said intention sequence conversion table, among the contiguous sequence of said partial intentions which construct said generated intention sequence, according to said intention sequence conversion rule.

* * * * *